(12) United States Patent
Ceder et al.

(10) Patent No.: US 11,791,463 B2
(45) Date of Patent: Oct. 17, 2023

(54) CATION-DISORDERED OXIDES FOR RECHARGEABLE LITHIUM BATTERIES AND OTHER APPLICATIONS

(71) Applicant: Massachusetts Institute of Technology, Cambridge, MA (US)

(72) Inventors: Gerbrand Ceder, Orinda, CA (US); Jinhyuk Lee, Walnut Creek, CA (US); Dong-Hwa Seo, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 17/830,979

(22) Filed: Jun. 2, 2022

(65) Prior Publication Data

US 2022/0367866 A1    Nov. 17, 2022

Related U.S. Application Data

(63) Continuation of application No. 15/748,704, filed as application No. PCT/US2016/048553 on Aug. 25, 2016, now abandoned.
(Continued)

(30) Foreign Application Priority Data

Nov. 13, 2015    (EP) ..................................... 15194519

(51) Int. Cl.
*H01M 4/485*    (2010.01)
*H01M 4/525*    (2010.01)
(Continued)

(52) U.S. Cl.
CPC ............ *H01M 4/485* (2013.01); *C01G 53/44* (2013.01); *H01M 4/525* (2013.01);
(Continued)

(58) Field of Classification Search
None
See application file for complete search history.

(56) References Cited

U.S. PATENT DOCUMENTS 9,780,363 B2    10/2017  Ceder et al.
2003/0022063 A1    1/2003  Pualsen
(Continued)

FOREIGN PATENT DOCUMENTS

EP          1189296 A2    3/2002

OTHER PUBLICATIONS

Lee et al., Science, vol. 343, p. 519, Jan. 31, 2014. (Year: 2014).*
(Continued)

*Primary Examiner* — Eli S Mekhlin
(74) *Attorney, Agent, or Firm* — Wolf, Greenfield & Sacks, P.C.

(57) ABSTRACT

Embodiments related to cation-disordered lithium metal oxide compounds, their methods of manufacture, and use are described. In one embodiment, a cation-disordered lithium metal oxide includes $Li_aM_bM'_cO_2$ with a greater than 1. M includes at least one redox-active species with a first oxidation state n and an oxidation state n' greater than n, and M is chosen such that a lithium-M oxide having a formula $LiMO_2$ forms a cation-disordered rocksalt structure. M' includes at least one charge-compensating species that has an oxidation state y that is greater than n.

19 Claims, 21 Drawing Sheets

Related U.S. Application Data

(60) Provisional application No. 62/210,377, filed on Aug. 26, 2015.

(51) Int. Cl.
    *C01G 53/00*        (2006.01)
    *H01M 10/0525*   (2010.01)
    *H01M 10/052*    (2010.01)

(52) U.S. Cl.
    CPC ..... *H01M 10/0525* (2013.01); *C01P 2002/72* (2013.01); *C01P 2006/40* (2013.01); *H01M 10/052* (2013.01)

(56) References Cited

U.S. PATENT DOCUMENTS

| | | |
|---|---|---|
| 2003/0206852 A1 | 11/2003 | Yang et al. |
| 2006/0099508 A1 | 5/2006 | Thackeray et al. |
| 2011/0240913 A1 | 10/2011 | Kim et al. |
| 2019/0088940 A1 | 3/2019 | Ceder et al. |

OTHER PUBLICATIONS

Glazier et al. ECF Conf. on Electrochem. Energy Conversion & Storage with SOFC-XIV, Glasgow, Scotland, Jul. 26-31, 2015, presented Jul. 27, 2015. (Year: 2015).*

International Search Report and Written Opinion dated Oct. 28, 2016 for Application No. PCT/US2016/048553.

International Preliminary Report on Patentability dated Mar. 8, 2018 for Application No. PCT/US2016/048553.

Extended European Search Report dated Jan. 24, 2017 for Application No. EP 15194519.3.

European Office Action dated Mar. 19, 2018 for Application No. EP 15194519.3.

Armstrong et al., Demonstrating oxygen loss and associated structural reorganization in the lithium battery cathode Li[Ni0.2Li0.2Mn0.6]O2. J Am Chem Soc. Jul. 5, 2006;128(26):8694-8. Epub Jun. 13, 2006.

Ates et al., A high rate Li-rich layered MNC cathode material for lithium-ion batteries. RSC Advances. 2015;5:27375-86. Epub Mar. 12, 2015.

Aydinol et al., Ab initio study of lithium intercalation in metal oxides and metal dichalcogenides. Phys Rev B. Jul. 15, 1997;56(3):1354-65.

Barpanda et al., A 3.90 V iron-based fluorosulphate material for lithium-ion batteries crystallizing in the triplite structure. Nat Mater. Oct. 2011;10(10):772-9. doi: 10.1038/nmat3093.

Chen et al., Disordered lithium-rich oxyfluoride as a stable host for enhanced Li+ intercalation storage. Adv Energy Mater. Feb. 3, 2015;5(9):1401814(1-7).

Chen et al., Li(+) intercalation in isostructural Li2VO3 and Li2VO2F with O(2-) and mixed O(2-)/F(-) anions. Phys Chem Chem Phys. Jul. 14, 2015;17(26):17288-95. doi: 10.1039/c5cp02505b.

Edstrom et al., The cathode-electrolyte interface in the Li-ion battery. Electrochim Acta. 2004;50:397-403.

Glazier et al., Synthesis and performance of disordered positive electrode materials for lithium ion batteries. ECS Conf on Electrochem Energy Conversion & Storage with SOFC-XIV. Glasgow, Scotland, Jul. 26-31, 2015. Abstract. Presented Monday, Jul. 27, 2015. https://ecs.confex.com/ecs/sofc2015/webprogram/Paper54051.html. 3 pages.

Goodenough et al., Challenges for rechargeable Li batteries. Chem Mater. 2010;22(3):587-603. doi: 10.1021/cm901452z.

Hara et al., Charge-discharge reaction mechanism of manganese molybdenum vanadium oxide as a high capacity anode material for Li secondary battery. J Mater Chem. Mar. 2003;13(4):897-903.

Hong et al., Critical role of oxygen evolved from layered li-excess metal oxides in lithium rechargeable batteries. Chem Mater. 2012;24(14):2692-7.

Jo et al., A new high power $LiNi_{0.81}Co_{0.1}Al_{0.09}O_2$ cathode material for lithium-ion batteries. Adv Energy Mater. 2014;4:1301583(1-8).

Jo et al., Effect of $LiCoO_2$ cathode nanoparticle size on high rate performance for Li-ion batteries. J Electrochem Soc. 2009;156(6):A430-4.

Kang et al., Battery materials for ultrafast charging and discharging. Nature. Mar. 12, 2009;458(7235):190-3. doi: 10.1038/nature07853.

Kang et al., Factors that affect Li mobility in layered lithium transition metal oxides. Phys Rev B. Sep. 26, 2006;74(9):094105(1-7).

Kang et al., Synthesis and electrochemical properties of layered Li0.9Ni0.45Ti0.55O2. Chem Mater. 2003;15:4503-7. Epub Oct. 9, 2003.

Kang et al.., Electrodes with high power and high capacity for rechargeable lithium batteries. Science. Feb. 17, 2006;311(5763):977-80.

Kim et al., A new coating method for alleviating surface degradation of $LiNi_{0.6}Co_{0.2}Mn_{0.2}O_2$ cathode material: Nanoscale surface treatment of primary particles. Nano Lett. 2015;15(3):2111-9. Epub Feb. 10, 2015.

Kim et al., $LiFePO_4$ with an alluaudite crystal structure for lithium ion batteries. Energy Environ Sci. 2013;6(3):830-4.

Kim et al., New iron-based mixed-polyanion cathodes for lithium and sodium rechargeable batteries: Combined first principles calculations and experimental study. J Am Chem Soc. Jun. 27, 2012;134(25):10369-72. doi: 10.1021/ja3038646. Epub Jun. 5, 2012.

Kim et al., The effect of antisite disorder and particle size on Li intercalation kinetics in monoclinic $LiMnBO_3$ Adv Energy Mater. Apr. 22, 2015;5(8):1401916(1-8).

Kim et al., Theoretical capacity achieved in a $LiMn_{0.5}Fe_{0.4}Mg_{0.1}BO_3$ cathode by using topological disorder. Energy Environ Sci. 2015;8:1790-8.

Koga et al., Operando x-ray absorption study of the redox processes involved upon cycling of the Li-rich layered oxide $Li_{1.20}Mn_{0.54}Co_{0.13}Ni_{0.13}O_2$ in Li ion batteries. J Phys Chem C. 2014;118:5700-9. Epub Feb. 20, 2014.

Lee et al., A new class of high capacity cation-disordered oxides for rechargeable lithium batteries: Li—Ni—Ti—Mo oxides. Energy & Environmental Science. 2015;8(11):3255-65. DOI: 10.1039/c5ee02329g.

Lee et al., Roles of surface chemistry on safety and electrochemistry in lithium ion batteries. Acc Chem Res. May 21, 2013;46(5):1161-70. doi: 10.1021/ar200224h. Epub Apr. 18, 2012.

Lee et al., The role of nanoscale-range vanadium treatment in $LiNi_{0.8}Co_{0.15}Al_{0.05}O_2$ cathode materials for Li-ion batteries at elevated temperatures. J Mater Chem A. May 15, 2015;3:13453-60.

Lee et al., Unlocking the potential of cation-disordered oxides for rechargeable lithium batteries. Science. Jan. 2014;343:519-22.

Li et al., Lithium-rich core-shell cathodes with low irreversible capacity and mitigated voltage fade. ECS Conf on Electrochem Energy Conversion & Storage with SOFC-XIV. Glasgow, Scotland, Jul. 26-31, 2015. Abstract. https://ecs.confex.con/ecs/sofc2015/webprogram/Paper53375.html. Presented Monday, Jul. 27, 2015. 3 pages.

Lu et al., Understanding the anomalous capacity of Li/Li [Ni x Li (1/3-2x/3) Mn (2/3-x/3)] O 2 cells using in situ X-ray diffraction and electrochemical studies. J Electrochem Soc. Jul. 1, 2002;149(7):A815-22. Epub May 9, 2002.

Lytle et al., Discussion of x-ray-absorption near-edge structure: Application to Cu in the high-Tc superconductors $La_{1.8}Sr_{0.2}CuO_4$ and $YBa_2Cu_3O_7$. Phys Rev B. Feb. 1, 1988;37(4):1550-63.

Mohanty et al., Structural transformation of a lithium-rich Li1.2Co0.1Mn0.55Ni0.15O2 cathode during high voltage cycling resolved by in situ X-ray diffraction. J Power Sources. Apr. 2013;229:239-48. Epub Dec. 12, 2012.

Obravac et al., Structure and electrochemistry of LiMO2 (M=Ti, Mn, Fe, Co, Ni) prepared by mechanochemical synthesis. Solid State Ionics. Sep. 1998;112(1):9-19.

Oh et al., A novel surface treatment method and new insight into discharge voltage deterioration for high-performance $0.4Li_2MnO_3$-$0.6LiNi_{1/3}Co_{1/3}Mn_{1/3}O_2$ cathode materials. Adv Energy Mater. Nov. 18, 2014;4(16):1400631(1-9).

Oh et al. Superior long-term energy retention and volumetric energy density for Li-rich cathode materials. Nano Lett. Oct. 8, 2014;14(10):5965-72. doi: 10.1021/nl502980k. Epub Sep. 2, 2014.

(56) References Cited

OTHER PUBLICATIONS

Ozawa et al., Structural modifications caused by electrochemical lithium extraction for two types of layered $LiVO_2$(R3m). J Power Sources. Dec. 6, 2007;174(2):469-72.

Park et al., $LiFeO_2$-incorporated $Li_2MoO_3$ as a cathode additive for lithium-ion battery safety. Chem Mater. 2012;24(14):2673-83. Epub Feb. 14, 2012.

Pralong et al., Lithium-rich rock-salt-type vanadate as energy storage cathode: $Li_{2-x}VO_3$. Chem Mater. 2012;24(1):12-4. Epub Dec. 6, 2011.

Qiao et al., Surface modification of Li-rich layered $Li/Li_{0.17}Ni_{0.25}Mn_{0.58})O_2$ oxide with Li—Mn—PO4 as the cathode for lithium-ion batteries. J Mater Chem A. 2013;1:5262-8.

Ravel et al., Athena, Artemis, Hephaestus: data analysis for X-ray absorption spectroscopy using IFEFFIT. J Synchrotron Radiat. Jul. 2005;12(Pt 4):537-41. Epub Jun. 15, 2005.

Ren et al., Improved voltage and cycling for Li(+) intercalation in high-capacity disordered oxyfluoride cathodes. Adv Sci (Weinh). Jun. 12, 2015;2(10):1500128(1-6). eCollection Oct. 2015.

Sakuda et al., Rock-salt-type lithium metal sulphides as novel positive-electrode materials. Sci Rep. May 8, 2014;4:4883(1-5). doi: 10.1038/srep04883.

Sakurai et al., Preparation of electrochemically active α-$LiFeO_2$ at low temperature. Solid State Ionics. Dec. 1, 1998;113-115:29-34.

Sathiya et al., Reversible anionic redox chemistry in high-capacity layered-oxide electrodes. Nat Mater. Sep. 2013;12(9):827-35. doi: 10.1038/nmat3699. Epub Jul. 14, 2013.

Stemmer et al., Oxidation states of titanium in bulk barium titanates and in (100) fiber-textured $(Ba_xSr_{1-x})Ti_{1+y}O_{3+z}$ thin films. Appl Phys Lett. Nov. 5, 2001;79(19):3149-51.

Thackeray et al., Comments on the structural complexity of lithium-rich $Li_{1+x}M_{1-x}O_2$ electrodes (M=Mn, Ni, Co) for lithium batteries. Electrochem Commun. 2006;8:1531-8.

Thackeray et al., Electrochemical extraction of lithium from $LiMn_2O_4$. Mater Res Bull. Feb. 1984;19(2):179-87.

Thackeray et al., $Li_2MnO_3$-stabilized $LiMO_2$ (M=Mn, Ni, Co) electrodes for lithium-ion batteries. J Mater Chem. Aug. 14, 2007;17(30):3112-25. Epub Apr. 20, 2007.

Trocoli et al., On the limited electroactivity of $Li_2NiTiO_4$ nanoparticles in lithium batteries. Electrochim Acta. 2013;100:93-100. Epub Mar. 30, 2013.

Twu et al., Designing new lithium-excess cathode materials from percolation theory: Nanohighways in Li(x)Ni(2-4x/3)Sb(x/3)O2. Nano Lett. Jan. 14, 2015;15(1):596-602. doi: 10.1021/nl5040754. Epub Dec. 17, 2014.

Urban et al., The configurational space of rocksalt-type oxides for high-capacity lithium battery electrodes. Adv Energy Mater. 2014;4:1400478(1-9).

Van Der Ven et al., Lithium diffusion in layered $Li_xCoO_2$. Electrochem and Solid-State Lett. 2000;3(7):301-4. Epub May 16, 2000.

Van Der Ven et al., Understanding Li diffusion in Li-intercalation compounds. Acc Chem Res. May 21, 2013;46(5):1216-25. doi: 10.1021/ar200329r. Epub May 14, 2012.

Weppner et al., Determination of the kinetic parameters of mixed-conducting electrodes and application to the system $Li_3Sb$. J Electrochem Soc. Oct. 1977;124(10):1569-78.

Yabuuchi et al., Detailed studies of a high-capacity electrode material for rechargeable batteries, Li2MnO3 LiCo(1/3)Ni(1/3)Mn(1/3)O2. J Am Chem Soc. Mar. 30, 2011;133(12):4404-19. Epub Mar. 4, 2011.

Yabuuchi et al., High-capacity electrode materials for rechargeable lithium batteries: Li3NbO4-based system with cation-disordered rocksalt structure. PNAS. Jun. 2015;112(25):7650-5. https://doi.org/10.1073/pnas.1504901112.

Yoon et al., In situ x-ray absorption spectroscopic study on $LiNi_{0.5}Mn_{0.5}O_2$ cathode material during electrochemical cycling. Chem Mater. 2003;15(16):3161-9.

Yu et al., Designing the next generation high capacity battery electrodes. Energy Environ Sci. 2014;7(5):1760-8.

Zhang et al., Synthesis and electrochemistry of cubic rocksalt Li—Ni—Ti—O compounds in the phase diagram of $LiNiO_2$-$LiTiO_2$-$Li[Li_{1/3}Ti_{2/3}]O_2$. J Power Sources. 2008;185(1):534-41. Epub Jul. 1, 2008.

\* cited by examiner

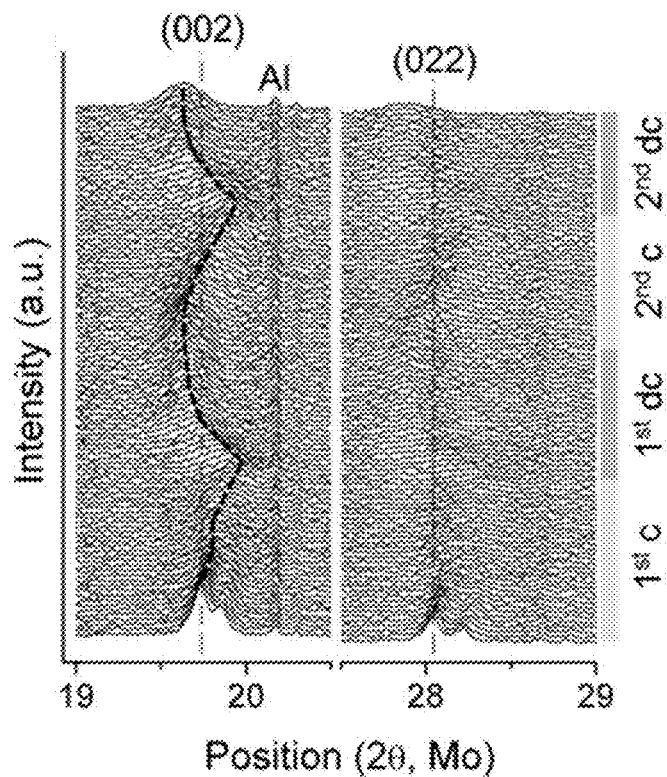
Fig. 17
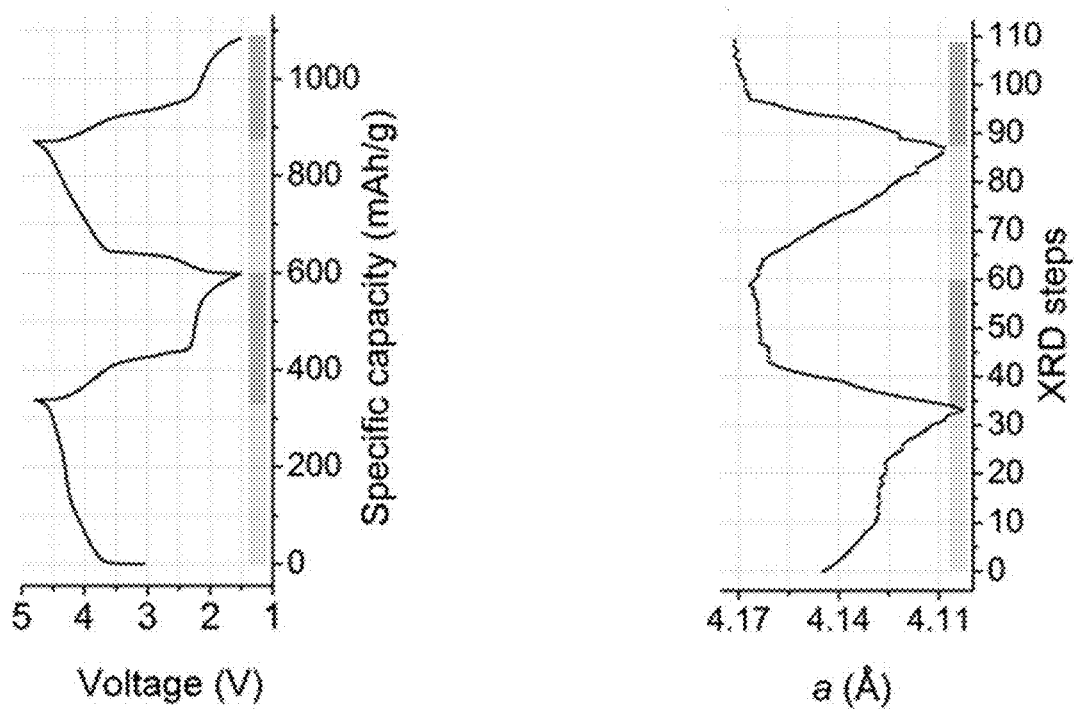
Fig. 18
Fig. 19

CATION-DISORDERED OXIDES FOR RECHARGEABLE LITHIUM BATTERIES AND OTHER APPLICATIONS

RELATED APPLICATIONS

This application is a continuation of U.S. patent application Ser. No. 15/748,704, now abandoned filed Nov. 26, 2018, entitled "Cation-Disordered Oxides for Rechargeable Lithium Batteries and Other Applications," which is a national stage application under 35 U.S.C. § 371 of International Patent Application Serial No. PCT/US2016/048553, filed Aug. 25, 2016, entitled "Cation Disordered Oxides for Rechargeable Lithium Batteries and Other Applications," which application claims priority to European Application Serial No. 15194519.3, filed Nov. 13, 2015, entitled "Cation-Disordered Oxides for Rechargeable Lithium Batteries and Other Applications," by Ceder, et al., which application claims priority to U.S. Provisional Patent Application Ser. No. 62/210,377, filed Aug. 26, 2015, entitled "Cation-Disordered Oxides for Rechargeable Lithium Batteries and Other Applications," by Ceder, et al. Said Int. Pat. Apl. Ser. No. PCT/US2016/048553 also claims priority to said U.S. Pat. Apl. Ser. No. 62/210,377. Each of these is incorporated herein by reference in its entirety.

FIELD

Disclosed embodiments are generally related to lithium metal oxides, e.g., for rechargeable lithium batteries or other applications.

BACKGROUND

Certain aspects of the invention relate to a lithium metal oxide characterized by a general formula: $Li_aM_bM'_cO_2$, said lithium metal oxide comprising a disordered rocksalt $LiMO_2$ structure enriched with $Li_xM'_yO_2$ units.

With increasing demand for high-performance lithium ion batteries, cathode materials with high energy density have been sought from diverse chemical spaces. In particular, oxide materials have drawn the most attention because they tend to deliver the highest energy densities. Recently, progress has been made in the oxide space, enlarging the search space of high energy density cathode materials to cation-disordered lithium transition metal oxides (Li-TM oxides).

This is known from Komaba et al. who published their work on the $Li_3NbO_4$-based disordered Li-excess materials [High-capacity electrode materials for rechargeable lithium batteries: $Li_3NbO_4$-based system with cation-disordered rocksalt structure, published in PNAS, doi: 10.1073/pnas.1504901112]. Nb appears to have a high valency within their compounds, although Komaba et al. did not specify the role of each species in their compounds. In addition, their material does not allow high capacity properties to be reached, and further presents poorly optimized performance.

SUMMARY

In one embodiment, a lithium metal oxide has a general formula $Li_aM_bM'_cO_2$. The lithium metal oxide comprises $LiMO_2$ and $Li_dM'_eO_2$, and the lithium metal oxide has a cation-disordered rocksalt structure. M includes one or more of a metallic species chosen from a group consisting of Ti, V, Cr, Ni, Co, Fe, Mn, Zr, Sb, and Mo, and M is chosen such that $LiMO_2$ forms a cation-disordered rocksalt structure. M has a first average oxidation degree n. M' includes one or more of a metallic species chosen from a group consisting of Ti, Mo, Cr, W, and Sb, and M' has a second average oxidation degree y greater than or equal to n. Further, in some embodiments, $4<=y<=6$, $1<a<=1.4$, $a+b+c=2$, $d+e=2$, $d+(e \cdot y)=4$, $a+(b \cdot n)+(c \cdot y)=4$, $1.3<=d<=1.7$, and $0.2<=b<1$.

In another embodiment, a lithium metal oxide has a general formula $Li_aM_bM'_cO_2$. The lithium metal oxide comprises a disordered $LiMO_2$ rocksalt structure enriched or doped with $Li_dM'_eO_2$, and the lithium metal oxide has a cation-disordered rocksalt structure. M comprises one or more of a metallic species chosen from a group consisting of Ti, V, Cr, Ni, Co, Fe, Mn, Zr, Sb, and Mo, and M is chosen such that $LiMO_2$ forms a cation-disordered rocksalt structure. M has a first average oxidation degree n. M' comprises one or more of a metallic species chosen from a group consisting of Ti, Cr, Mn, Zr, Mo, Sn, Sb, and W, and M' has a second average oxidation degree y greater than or equal to n. Further, $4<=y<=6$, $1<a<=1.4$, $a+b+c=2$, $d+e=2$, $d+(e \cdot y)=4$, $a+(b \cdot n)+(c \cdot y)=4$, $1.3<=d<=1.7$, and $0.2<=b<1$.

In yet another embodiment, a lithium metal oxide includes $Li_aM_bM'_cO_2$ having a cation-disordered rocksalt structure. M includes at least one redox-active metallic species having a first oxidation state n and a second oxidation state n' greater than (>) n, and M' includes at least one charge-compensating metallic species having an oxidation state y. In some cases, y may be greater than or equal to n. The value a is greater than 1, and b and c are greater than or equal to 0. Further, M is chosen in some cases such that a lithium-M oxide having a formula $LiMO_2$ forms a cation-disordered rocksalt structure.

In a further embodiment, a lithium metal oxide includes $Li_{1+x/100}(NiTi)_{1/2-x/120}Mo_{x/150}O_2$ in which $0<x<=30$.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 17 is a graph of in situ XRD patterns of LNTMO20;

FIG. 18 is a graph of the voltage profile corresponding to the XRD patterns of FIG. 17;

FIG. 19 is a graph of the lattice parameter corresponding to the XRD patterns of FIG. 17;

DETAILED DESCRIPTION

Figure 1:
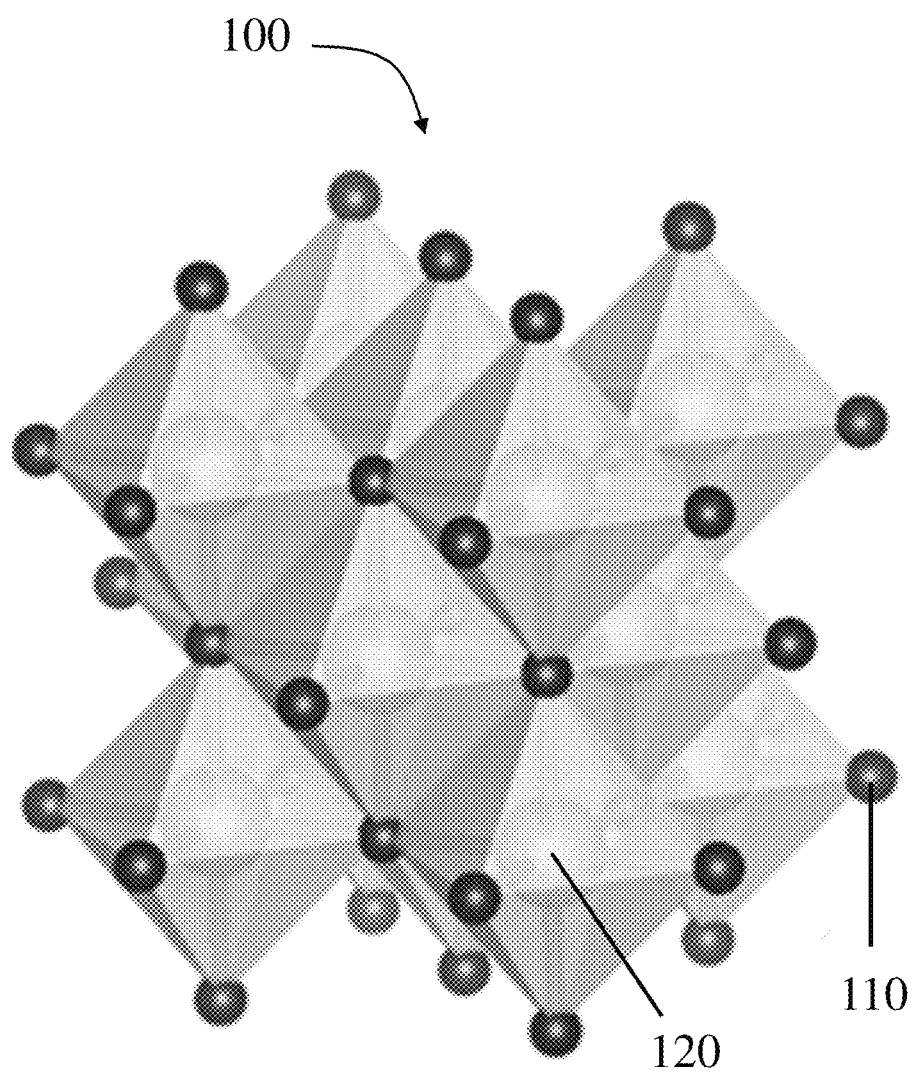
FIG. 1 is a schematic representation of a cation-disordered rocksalt-type crystal structure.

Cation-disordered Li-TM oxides such as those described herein may provide high capacities and high energy densities when the disordered Li-TM oxide includes a suitable lithium excess. Without wishing to be bound by theory, a lithium excess may result in the formation of a percolating network of lithium diffusion pathways which allow for improved electrochemical performance. In some cases, adding excess lithium to a Li-TM oxide results in a relative decrease in the amount of the transition metal ions, and therefore the transition metal ions are required to transition to a higher oxidation state in order to compensate the charge, thereby reducing the capacity of the transition metal ions to be further oxidized during charge. This in turn may lead to a reduction in the redox capacity of the transition metal ions and therefore limit the overall electrochemical performance of the Li-TM oxide material.

In view of the above, certain embodiments are generally directed to a cation-disordered Li-TM oxide that includes a high-valent charge compensating species. Without wishing to be bound by theory, a charge compensating species may allow a redox-active species in the Li-TM oxide to remain at a lower oxidation state, even with a high lithium excess. In this manner, the redox capacity of the redox active species may be increased, and therefore the overall electrochemical performance of the Li-TM oxide material may be improved.

According to some embodiments, a cation-disordered Li-TM oxide has a general formula of $Li_aM_bM'_cO_2$ in which a has a value greater than 1 to provide a lithium excess, M includes at least one redox-active transition metal species, and M' includes at least one charge-compensating transition metal species. Further, the redox-active species has a first oxidation state n and a second oxidation state n', where n' is greater than n, and the charge compensating species has an oxidation state y that is greater than or equal to n.

In some embodiments, M is chosen such that it forms a cation-disordered Li-TM oxide without the addition of M'. Specifically, M may include one or more transition elements in any suitable proportion, chosen such that a lithium-M oxide having a formula $LiMO_2$ forms a cation-disordered rocksalt structure. For example, it has been recognized that $Li(NiTi)_{1/2}O_2$ forms a cation-disordered rocksalt structure. Therefore, in some embodiments, M includes equal portions of Ni and Ti (i.e., M is $(NiTi)_{1/2}$). In other embodiments, M may include one or more of Ti, V, Cr, Ni, Co, Fe, Mn, Zr, Sb, and Mo, one or more of Ti, V, Cr, Ni, Co, Fe, Mn, and Zr, one or more of Ti, V, Cr, Ni, Co, Fe, Mn, Zr, and Sb, one or more of Ti, V, Cr, Ni, Co, Fe, Mn, Zr, and Mo, etc.

It should be understood that a Li-TM oxide material may include any suitable lithium excess. In some embodiments, a higher lithium excess may improve performance by providing a more extensive network of diffusion channels for lithium ions, which may allow a relatively higher fraction of the lithium ions to move through the material. For example, in the embodiments described above having a formula of $Li_aM_bM'_cO_2$, the value a may be greater than or equal to (>=) 1.05, greater than or equal to 1.10, greater than or equal to 1.15, greater than or equal to 1.20, or greater than or equal to 1.30, etc. In some embodiments, a may be less than or equal to (<=) 1.40, less than or equal to 1.30, or less than or equal to 1.20. Combinations of any of the above ranges for a are also contemplated; for example, a may be between or equal to 1.0 and 1.40, 1.05 and 1.30, or any other appropriate range. Further, in certain embodiments, a minimum lithium excess may be needed to achieve a percolating network of lithium diffusion pathways, which may be required to achieve a suitable level of electrochemical performance. For example, in one embodiment, the minimum lithium excess may correspond to an a value of about 1.09. However, it should be understood that in other embodiments, the minimum lithium content to achieve a percolating network of lithium diffusion pathways may correspond to an a value of less than 1.09, or greater than 1.09, as the disclosure is not so limited.

In some embodiments, b in the above formula may be less than 1. For example, b may be less than 0.9, less than 0.8, less than 0.7, less than 0.6, or less than 0.5. In addition, b may be greater than or equal to 0.2. For instance, b may be greater than or equal to 0.3, greater than or equal to 0.4, or greater than or equal to 0.5. Combinations of any of these are also possible, e.g., b may be between 0.2 and 1. Similarly, in some embodiments, c in the above formula may be less than 1. For example, c may be less than 0.9, less than 0.8, less than 0.7, less than 0.6, or less than 0.5. In addition, c may be greater than or equal to 0.2. For instance, c may be greater than or equal to 0.3, greater than or equal to 0.4, or greater than or equal to 0.5. Combinations of any of these are also possible, e.g., c may be between 0.2 and 1. Moreover, in some embodiments, the values for b and c may be related to the a value. For example, in one embodiment, b may be defined as $b=(8-5 \cdot \alpha)/3$, and c may be defined as $c=[2(a-1)]/3$. However, it should be understood that other relationships between a, b, and c may be possible, as the present disclosure is not so limited.

In some embodiments, the compound may be substantially neutrally changed (i.e., electrically neutral), such that the presence of positive species (e.g., Li or transition metals) and negative species (e.g., oxygen) within the compound are balanced. Thus, for example, in the above formula, a+b+c may be about 2, and a+(b·n)+(cy) may be about 4 (based on compensating the charge of the oxygen ions). In certain embodiments, a compound having a general formula $Li_aM_bM'_cO_2$ may be described as a disordered $LiMO_2$ structure (e.g., a cation-disordered rocksalt structure) enriched with an appropriate portion of $Li_dM'_eO_2$ to form a single phase, cation-disordered structure. For example, d+e may be about 2, and d+(e·y) may be about 4. In some embodiments, d may be between about 1.3 and 1.7, and the proportions of $LiMO_2$ and $Li_xM'_yO_2$ may be chosen appropriately to provide a $Li_aM_bM'_cO_2$ compound with suitable values for a, b, and c, such as those described above.

As described above, in some embodiments, M includes at least one redox-active species having at least a first oxidation state n and a second oxidation n', where n' is greater than n. In some cases, M is a transition metal. For example, in some embodiments, M may include Ni in which n is 2+ and n' is 4+. In other embodiments, M may include at least one of Ti, V, Cr, Mn, Fe, Co, Ni, Zr, Sb, and Mo as the redox-active species. In certain embodiments, M may include two or more species in any appropriate proportion, with at least one of the species being a redox-active species. For example, in one embodiment, M includes equal portions of Ni and Ti (i.e., M is $(NiTi)_{1/2}$), with Ni being the redox active species. Depending on the particular embodiment, n may have a value of 2+ and n' may have a value of 3+, 4+, 5+, or 6+, n may have a value of 3+ and n' may have a value of 4+, 5+, or 6+, or n may have a value of 4+ and n' may have a value of 5+ or 6+. Moreover, in some embodiments, M may have an average oxidation state between about 2.7 and about 3.3 (e.g., about 3). For example, in the embodiment described above including equal portions of Ni and Ti, M has an average oxidation state of about 3 (i.e., the equal portions of $Ni^{2+}$ and $Ti^{4+}$ ions provides an average degree of oxidation of about 3+). In some cases, the oxidation state may be at least about 1.8 or at least about 2.7.

Further, according to some embodiments, M' includes at least one high-valent charge-compensating species having an oxidation state y that is greater than or equal to n. In this manner, the addition of the charge compensating-species M' may allow for excess lithium to be included in a Li-TM oxide without undesirably causing the redox-active species M to move to an oxidation state higher than n. The charge compensating species may be a transition metal or other atom that can have a relatively high oxidation state. For example, in some embodiments, M' may include Mo in which y is 6+. In other embodiments, M' may include at least one of Ti, Cr, Mn, Zr, Nb, Mo, Sn, Sb, and W. In further embodiments, M' may include at least one of Ti, Cr, Mn, Zr, Mo, Sn, Sb, and W. Depending on the embodiment, y (representing the oxidation state of the charge compensation species) may have a value of, e.g., 4+, 5+, or 6+ or more.

Depending on the particular embodiment, a cation-disordered lithium metal oxide may have a suitable crystal structure, for example, a rocksalt-type structure as is known by those of ordinary skill in the art. For example, FIG. 1 depicts a schematic representation of a cation-disordered rocksalt-type structure 100 in accordance with some embodiments. This structure includes oxygen ions 110 arranged in a cubic-close-packed sub-lattice, and cations 120 positioned at the octahedral sites of the oxygen sub-lattice. For example, in the $Li_aM_bM'_c O_2$ compound described above, the cations 120 may be any of Li, M, and M' ions positioned randomly in the octahedral sites of the oxygen sub-lattice. Further, it should be understood that in embodiments in which M and/or M' include more than one element, the cations may be any of the elements included in M and/or M', as discussed herein. Ordered or disordered structures may be identified, for example, using X-ray diffraction (XRD) or other techniques as discussed herein.

In some embodiments, one or more species may be included in M and/or M' to promote the formation of a desired crystal structure. For example, a compound may include two or more species known to form a disordered lithium oxide structure. As an illustrative example, $Li(NiTi)_{1/2}O_2$ is known to form a disordered rocksalt-type structure, and therefore it may be desirable to include NiTi as M in the formula $Li_aM_bM'_C O_2$ to make a cation-disordered structure energetically favorable. Alternatively, a cation-disordered structure may not be energetically favorable in some embodiments, as the disclosure is not so limited. In some embodiments, the disordered structure may be a metastable structure that may be formed via suitable processing.

According to some aspects of the present disclosure, a cation-disordered Li-TM oxide material as described herein may be used as an electrode material in an electrical device, e.g., as a cathode material in a rechargeable lithium ion battery. Such cathode materials operate by reversibly releasing (de-intercalation) and reinserting (intercalation) lithium ions during charge and discharge, respectively. As such, the presence of a percolating network of lithium diffusion pathways, resulting from a lithium excess in the structure, may allow the lithium ions to move easily into and out of the material. As lithium ions de-intercalate during charge, the redox-active species oxidizes from a first oxidation state n, towards a higher oxidation state n'. In this manner, the addition of the charge-compensating species M' to maintain the redox-active species in its lower oxidation state n, allows a higher fraction of the redox-active species to be oxidized during charging, and therefore increases the charge capacity of the Li-TM oxide. During discharge, this process reverses; specifically, lithium ions intercalate the Li-TM oxide, and the redox-active species is reduced to its first, lower oxidation state n. It should be understood that during charge and/or discharge, the charge-compensating species may not substantially change its oxidation state (i.e., the oxidation state remains substantially equal to y during charge and/or discharge), at least in certain embodiments.

In some embodiments, a redox-active species may not be fully oxidized to a second oxidation state n' during charge, and instead be may only partially oxidized to an intermediate oxidation state between n and n'. Further, in certain embodiments, additional capacity beyond what is provided by the redox-active species may be provided by other mechanisms during charge and/or discharge, including, but not limited to, oxygen loss and oxygen oxidation.

According to some embodiments, a Li-TM oxide material according to the present disclosure may exhibit a first discharge capacity of greater than 50 mAh/g, greater than 75 mAh/g, greater than 100 mAh/g, greater than 125 mAh/g, greater than 150 mAh/g, greater than 175 mAh/g, greater than 200 mAh/g, or higher when charged and discharged between 1.50 V and 4.00 V at 20 mA/g at room temperature. In some embodiments, the Li-TM oxide may exhibit a specific energy density, e.g., of up to approximately 680 Wh/kg. However, it should be understood that other discharge capacities and/or specific energy densities may also be possible, as the disclosure is not so limited.

As mentioned, in certain embodiments, the crystal structure of a cation-disordered Li-TM oxide may be determined and/or confirmed via X-ray diffraction (XRD) measurements. An XRD pattern may include one or more characteristic peaks that correspond to a cation-disordered rocksalt-type structure, such as that described above with regard to FIG. 1. For example, in one embodiment corresponding to a disordered rocksalt-type structure (Fm-3m space group), an XRD pattern collected using Cu Kα radiation may show, over a range of 5 to 70 degrees 2θ (two theta), a series of peaks with normalized intensity rations $I'_z$, with $I'_z=I_z/I_{(111)}$, where $I_z$ is the intensity of a peak corresponding to (z) and $I_{(111)}$ is the a intensity of a (111) peak. In this embodiment, when z refers to a (111) peak, $I'_z=1$, when z refers to a (022) peak, $2<=I'_z<=5$, and when z refers to a (002) peak, $4<=I'_z<=10$. However, it should be understood that other crystal structures may exhibit different XRD patterns with other peak intensity values, as the disclosure is not limited in this regard.

Having generally described the cation-disordered Li-TM oxide materials and their properties, one possible method for synthesizing these materials is described below.

However, it is believed that these materials may be formed in any of a number of ways, as the current disclosure is not limited to any one formation method for these compounds.

In one embodiment, for instance, a cation-disordered Li-TM oxide compound may be prepared by combining one or more suitable precursors together, dispersing the precursors in a suitable solvent, milling (e.g., ball milling) the mixture of precursor and solvent, and drying the mixture in an oven. The mixture of precursors may be subsequently pelletized and/or sintered, and then ground, e.g., into a fine powder. Suitable precursor materials may include, but are not limited to, lithium and transition metal salts, and transition metal oxides. For example, in some embodiments, $Li_2CO_3$, $Li_2O$, $NiCO_3$, $NiO$, $TiO_2$, $MoO_2$, and $MoO_3$ may be used as precursors, and acetone or acetonitrile ($C_2H_3N$) may be used as the solvent.

European Application Serial No. 15194519.3, entitled "Cation-Disordered Oxides for Rechargeable Lithium Batteries and Other Applications," by Ceder, et al. and U.S. Provisional Patent Application Ser. No. 62/210,377, entitled "Cation-Disordered Oxides for Rechargeable Lithium Batteries and Other Applications," by Ceder, et al. are each incorporated herein by reference in its entirety for all purposes.

NON-LIMITING EXAMPLES

Several non-limiting examples regarding various cation-disordered Li-TM oxides in accordance with the current disclosure are discussed further below.

In one example, a cation-disordered Li-TM oxide having the general formula $Li_{1+x/100}(NiTi)_{1/2-x/120}Mo_{x/150}O_2$ was investigated for x having a value of 0, 5, 10, 15, and 20. In this example, $(NiTi)_{1/2}$ corresponds to M and Mo corresponds to M' in the $Li_aM_bM'_cO_2$ compound described above, with a=1+x/100, b=1−x/60, and c=x/150. Further, in this example, Ni is the redox-active species with n=2+ and n'=4+, and Mo is the charge-compensating species with y=6+.

To synthesize $Li_{1+x/100}(NiTi)_{1/2-x/120}Mo_{x/150}O_2$ (x=0, 5, 10, 15, 20), $Li_2CO_3$ (Alfa Aesar, ACS, 99% min), $NiCO_3$ (Alfa Aesar, 99%), $TiO_2$ (Alfa Aesar, 99.9%), and $MoO_2$ (Alfa Aesar, 99%) were used as precursors. Other than for $LiNi_{0.5}Ti_{0.5}O_2$ (x=0), a stoichiometric amount of precursors were used. For $LiNi_{0.5}Ti_{0.5}O_2$, 5% excess Li precursor and 4% excess Ni precursor were used, because it resulted in the purest disordered rocksalt phase with a composition close to the desired composition. The precursors were dispersed into acetone and ball-milled for 15 hours, and then dried overnight in an oven. The mixture of the precursors was pelletized and then sintered at 750 degrees C. for two hours in air, followed by furnace cooling to room temperature. After the sintering, the pellets were manually ground into fine powder.

The X-ray diffraction (XRD) patterns for the as-prepared compounds were collected on a PANalytical multipurpose diffractometer (Cu source) in the 2Θ (two theta) range of 5-85 degrees. Rietveld refinement was completed using PANalytical X'pert HighScore Plus software. Scanning electron microscopy (SEM) images were collected on a Zeiss Merlin High-resolution SEM. Elemental analysis of the compounds was performed with direct current plasma emission spectroscopy (ASTM E 1097-12).

Electron energy loss spectroscopy (EELS) spectra were obtained from thin specimens on a JEOL 2010F equipped with a Gatan spectrometer, using parallel incident electron beam and semi-collection angle of 8 mrad in TEM diffraction mode. EELS quantification was performed by using a signal integration window of 50 eV, Hartree-Slater model of partial ionization cross section, and power law background subtraction.

For in situ XRD, an in situ cell was designed with a Be window for X-ray penetration. The cell was configured with a $Li_{1.2}Ni_{1/3}Ti_{1/3}Mo_{2/15}O_2$ electrode film as the working electrode, Li metal foil as the counter electrode, 1M of $LiPF_6$ in EC:DMC (1:1) solution as the electrolyte, and glass fiber as the separator. Galvanostatic charge-discharge of the in situ cell was performed on a Solartron electrochemical potentiostat (SI12287) between 1.5-4.8 V at 10 mA/g. The in situ XRD patterns were obtained in one hour intervals from a Bruker D8 Advanced Da Vinci Mo-source diffractometer (Mo source) in the 2θ(two theta) range of 7-36 degrees. Rietveld refinement on the in situ XRD patterns was performed using PANalytical X'pert HighScore Plus software for every other scan.

Ni, Ti, and Mo K-edge ex-situ X-ray absorption near edge spectroscopy (XANES) measurements were performed in transmission made using beamline 20BM at the Advanced Photon Source. The incident energy was selected using a Si (111) monochromator. The energy calibration was performed by simultaneously measuring the spectra of the appropriate metal foil. Harmonic rejection was accomplished using a Rh-coated mirror. The samples for the measurements were prepared with the $Li_{1.2}Ni_{1/3}Ti_{1/3}Mo_{2/15}O_2$ electrode films (a) before cycling, (b) after the first charge to 4.8 V at 20 mA/g, and (c) after the first charge to 4.8 V then discharge to 1.5 V at 20 mA/g. The loading density of the films was ~5 mg/cm². Additionally, spectra of some reference standards were measured in transmission mode, to facilitate interpretation of the XANES data. Data reduction was carried out using the Athena software.

To prepare a cathode film for electrochemical characterization, the powder of the Li—Ni—Ti—Mo oxides and carbon black (Timcal, Super P) were first mixed by a planetary ball mill (Retsch PM200) in a weight ratio of 70:20 for two hours at 300 rpm. Then, polytetrafluoroethylene (PTFE, DuPont, Teflon 8C) was added to the mixture as a binder, such that the cathode film consisted of the Li—Ni—Ti—Mo oxide powder, carbon black, and PTFE in a weight ratio of 70:20:10. The components were manually mixed for 30 minutes and rolled into a thin film inside an argon-filled glove box. To assemble a cell for all cycling tests, a 1 M $LiPF_6$ in ethylene carbonate (EC) and dimethyl carbonate (DMC) solution (1:1, Techno Semichem), Celgard 2500 polypropylene separator, and Li metal foil (FMC) were used as the electrolyte, the separator, and the counter electrode, respectively. Swagelok-type cells were assembled inside an argon-filled glove box and tested on a Maccor 2200 at room temperature in the galvanostatic mode. Cyclic voltammetry tests were performed on a Solartron electrochemical potentiostat (1470E) between 1.5-4.1 V (or 1.5-4.5

V) at 0.1 mV/s. The loading density of the cathode film was ~5 mg/cm². The specific capacity was calculated based on the amount of the Li—Ni—Ti—Mo oxides (70 wt %) in the cathode film.

Figure 2:
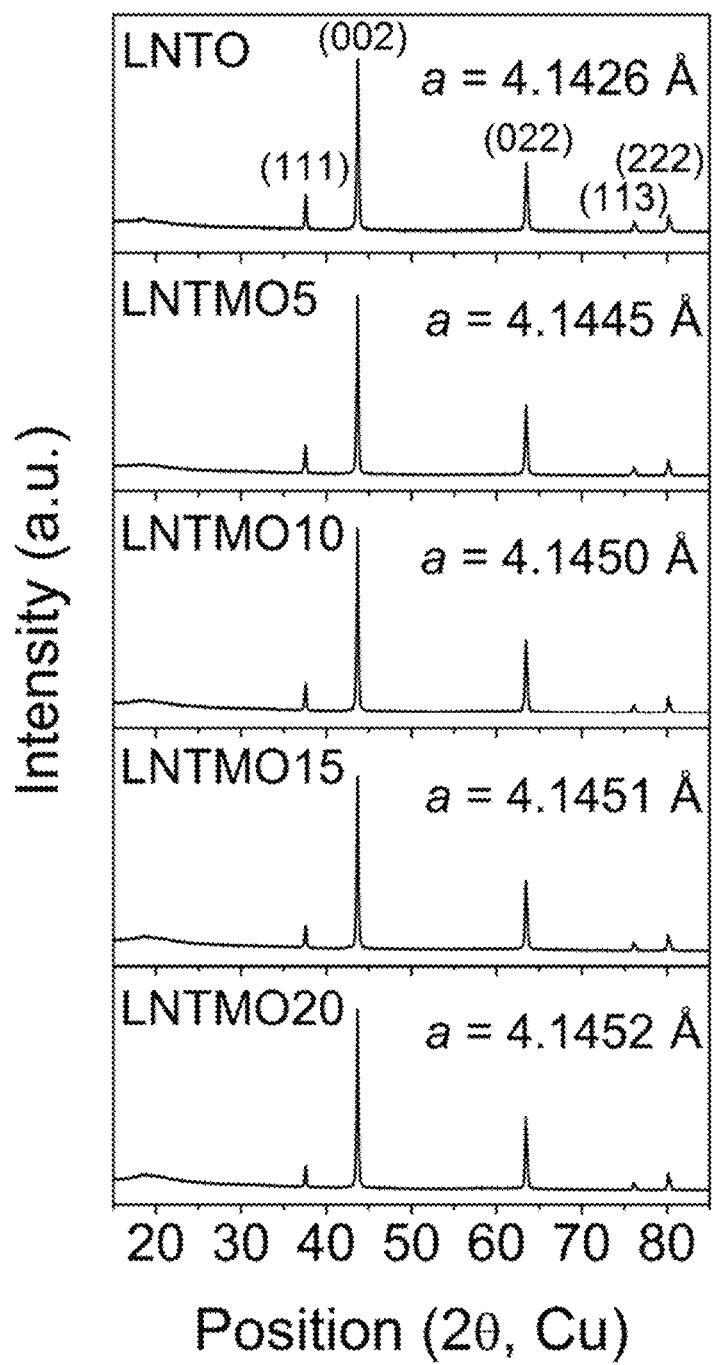
FIG. 2 shows graphs of X-Ray diffraction patterns of $Li_{1+x/100}(NiTi)_{1/2-x/120}Mo_{x/150}O_2$ (x=0, 5, 10, 15, 20) compounds.
Figure 3:
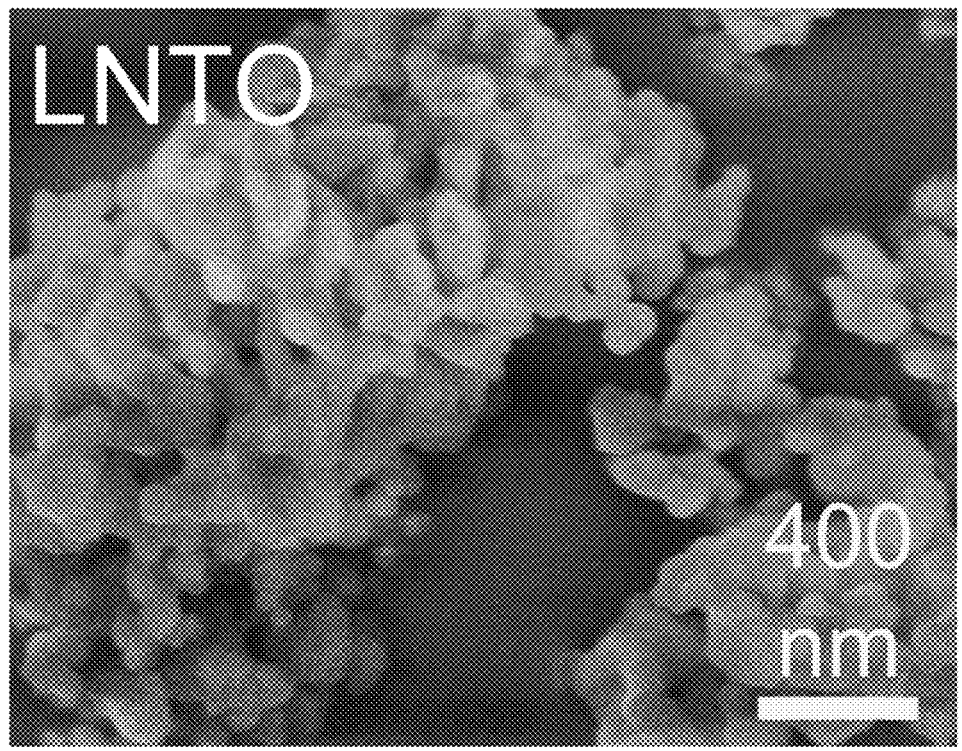
FIG. 3 is an SEM micrograph of LNTO.
Figure 4:
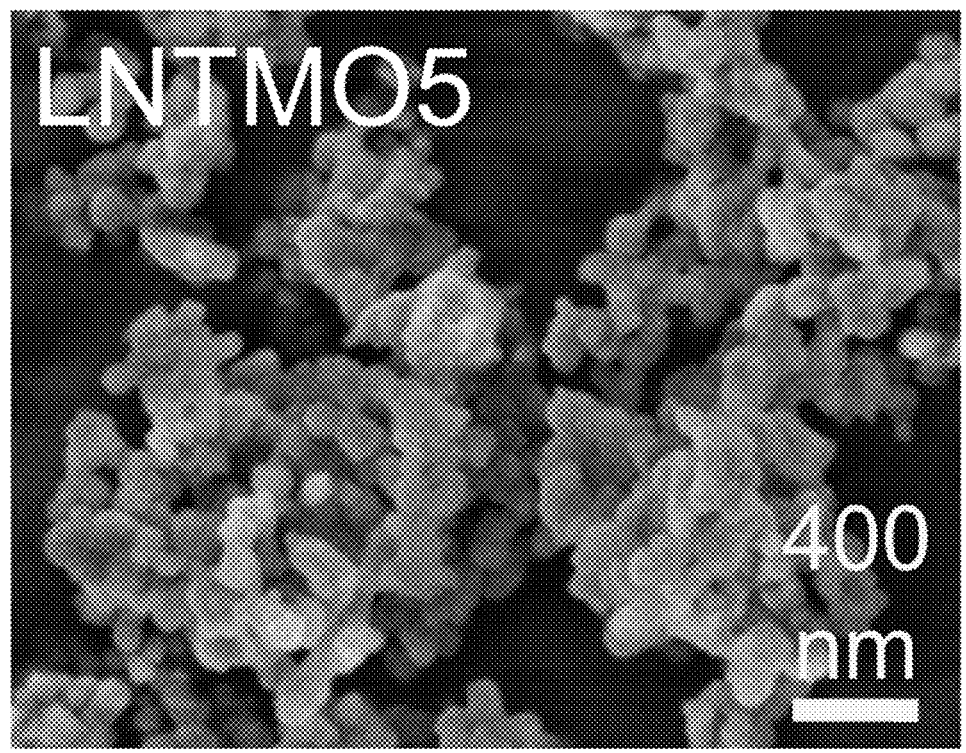
FIG. 4 is an SEM micrograph of LNTMO5.
Figure 5:
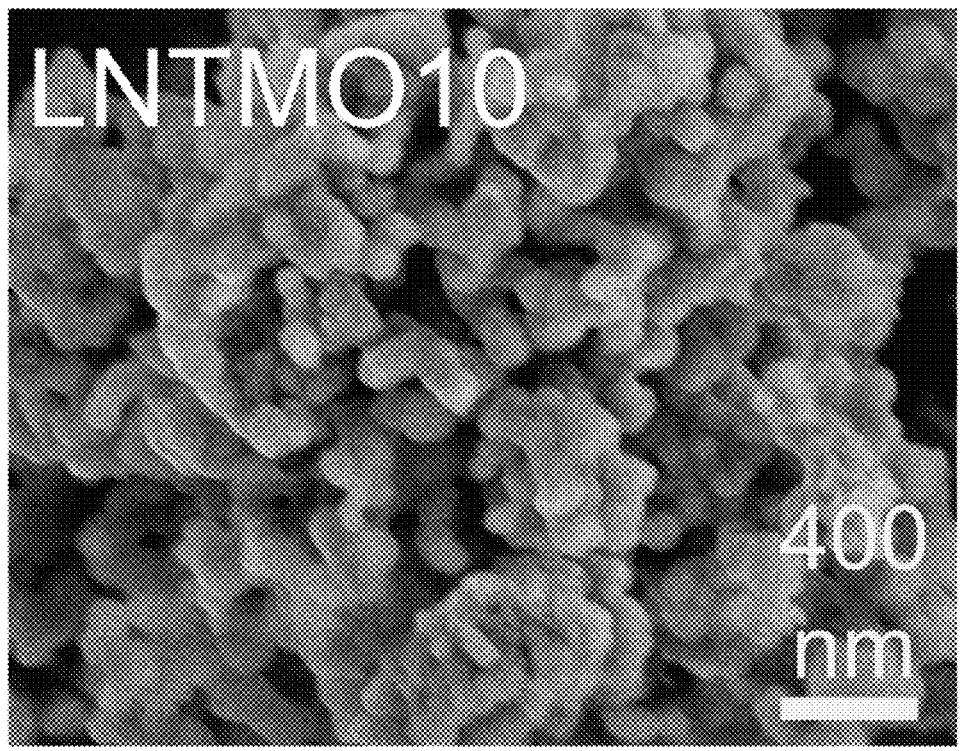
FIG. 5 is an SEM micrograph of LNTMO10.
Figure 6:
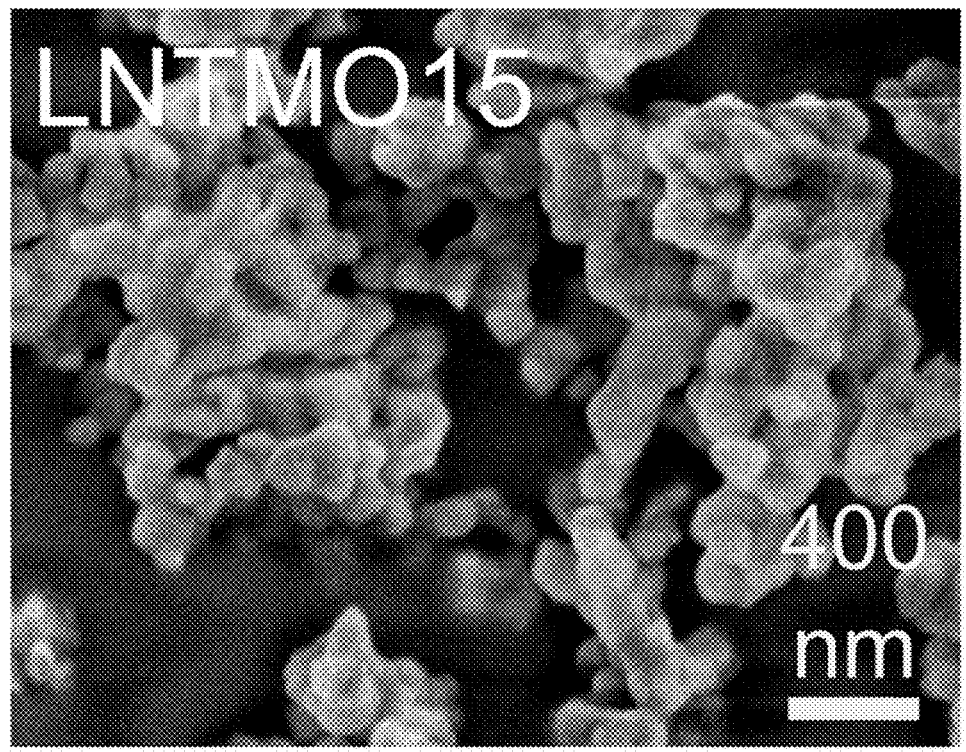
FIG. 6 is an SEM micrograph of LNTMO15.
Figure 7:
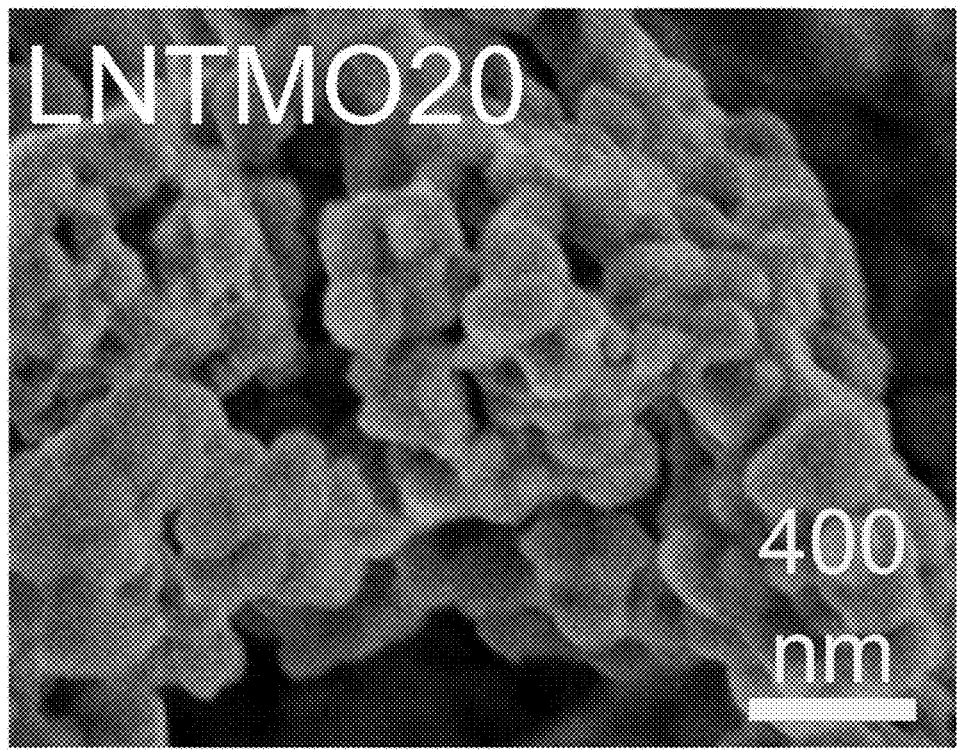
FIG. 7 is an SEM micrograph of LNTMO20.

FIG. 2 shows the XRD patterns of the $Li_{1+x/100}(NiTi)_{1/2-x/120}Mo_{x/150}O_2$ (x=0, 5, 10, 15, 20) compounds. Hereafter, $LiNi_{0.5}Ti_{0.5}O_2$ (x=0) will be referred to as LNTO, and $Li_{1+x/100}(NiTi)_{1/2-x/120}Mo_{x/150}O_2$ with x=5, 10, 15, and 20 will be referred to as LNTMO5, LNTMO10, LNTMO15, and LNTMO20, respectively. The XRD patterns depicted in FIG. 2 are consistent with a disordered rocksalt structure, and the patterns do not show any strong intensity peaks between 2θ(two theta) angles of 16-20 degrees, confirming the (nearly) fully cation-disordered structure with an absence of obvious short or long range ordering of the cations. Further, the elemental analysis of the compounds summarized in Table 1 show that the target phases are successfully synthesized. The insets in FIG. 2 are the lattice parameters of each compound. The lattice parameter increases slightly with Li excess. This trend is consistent with the hypothetical $Li_{1.6}Mo_{0.4}O_2$ having bigger average cationic radius (0.726 Å) than $Li(NiTi)_{0.5}O_2$ (0.704 Å). Thus, introducing excess Li to $Li(NiTi)_{0.5}O_2$ by incorporating $Li_{1.6}Mo_{0.4}O_2$ should increase the lattice parameter.

TABLE 1

| Li Excess (%) | Target Ratio (Li:Ni:Ti:Mo) | Actual Ratio (Li:Ni:Ti:Mo) |
|---|---|---|
| 0 | 1:0.5:0.5:0 | 0.99:0.51:0.5:0 |
| 5 | 1.05:.458:.458:0.033 | 1.04:.45:.457:0.035 |
| 10 | 1.1:0.417:0.417:0.067 | 1.08:0.42:0.43:0.069 |
| 15 | 1.15:0.375:0.375:0.1 | 1.15:0.365:0.385:0.1 |
| 20 | 1.2:0.333:0.333:0.133 | 1.2:0.32:0.35:0.135 |

Figure 8:
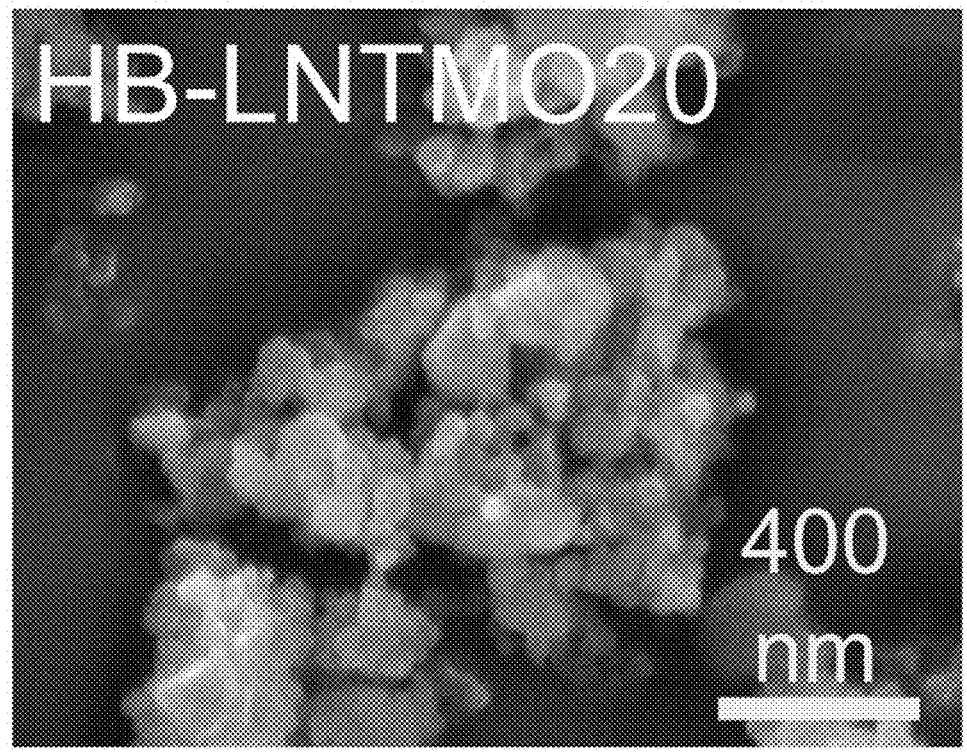
FIG. 8 is an SEM micrograph of LNTMO20 after high-energy ball milling.

FIGS. 3-7 show SEM micrographs for LNTO, LNTMO5, LNTMO10, LNTMO15, and LNTMO20, respectively. These SEM results show that small primary particles, less than 200 nm in diameter (d), are highly agglomerated in secondary particles for all of the compounds. The average primary particle size is the smallest for LNTO (d~80 nm) and the largest for LNTMO20 (d~150 nm). FIG. 8 shows an SEM micrograph of the LNTMO20 compound after high-energy ball milling with the carbon black (for the electrode fabrication, as described above). As shown in FIG. 8, after high-energy ball milling, the primary particle size becomes slightly less than d~100 nm on average and the size distribution becomes wider.

Figure 9:
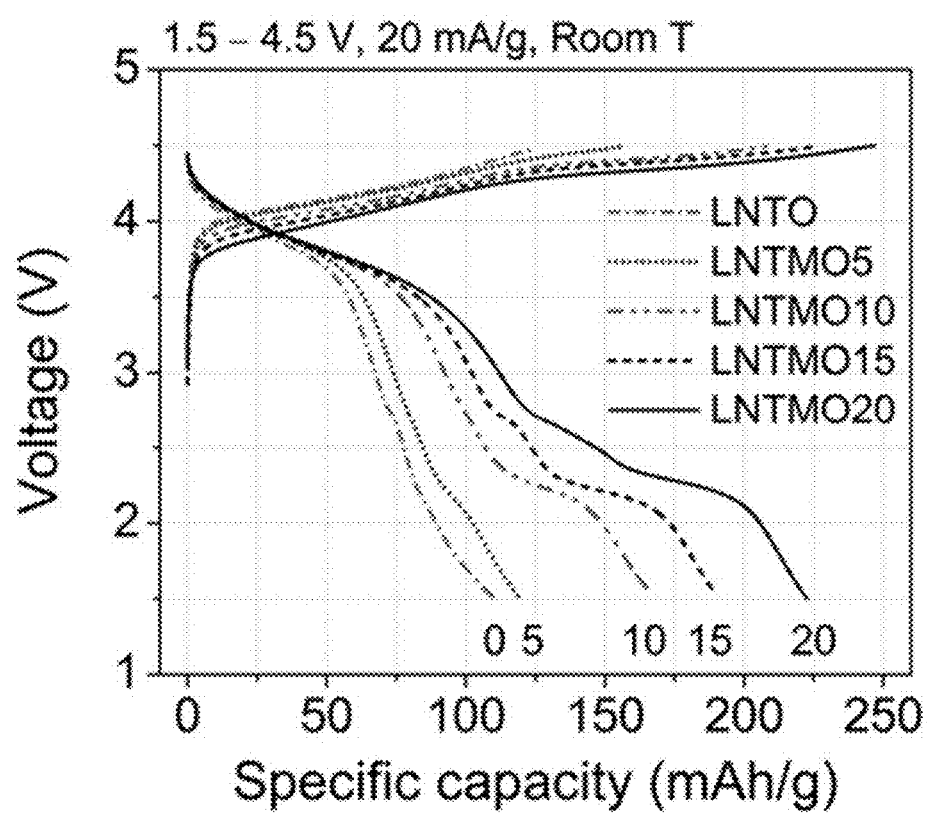
FIG. 9 is a graph of the first cycle voltage profiles of LNTO, LNTMO5, LNTMO10, LNTMO15, and LNTMO20.
Figure 10:
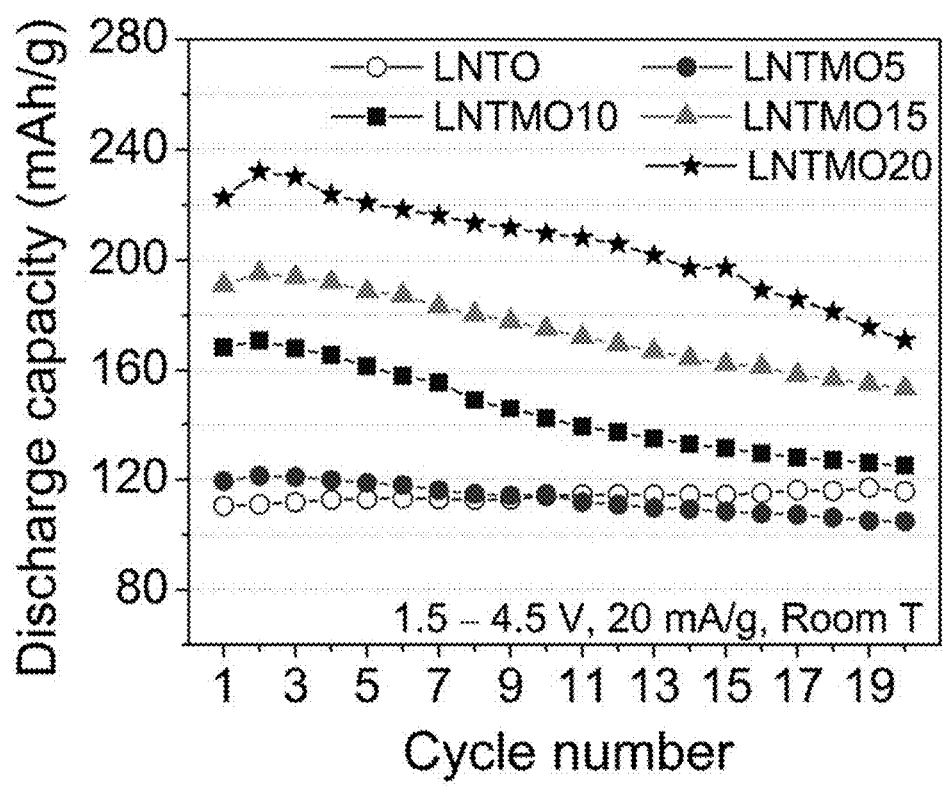
FIG. 10 is a graph of the capacity change of LNTO, LNTMO5, LNTMO10, LNTMO15, and LNTMO20 over 20 cycles.

The cycling performance of the materials was tested by galvanostatic charge-discharge tests. FIG. 9 shows the first cycle voltage profiles of LNTO, LNTMO5, LNTMO10, LNTMO15, and LNTMO20 when cycled between 1.5-4.5 V at 20 mA/g. The charge-discharge capacity increases with Li excess from ~110 mAh/g to ~225 mAh/g. The shape of the voltage curves also evolves with Li excess, with the beginning of the first charge starting at lower voltage and the 4.3 V plateau becoming longer with higher Li excess, all of which lead to higher charge capacity. A substantial increase in the discharge capacity is achieved with higher Li excess. The first discharge capacity of LNTO is only 109 mAh/g, but that of LNTMO20 is as high as 223 mAh/g. It is notable that the capacity of LNTMO20 exceeds its theoretical $Ni^{2+}/Ni^{4+}$ capacity (=201.6 mAh/g), indicating that not only $Ni^{2+}/Ni^{4+}$ but also other redox couples are active in LNTMO20. Further, FIG. 10, which depicts the discharge capacity of the materials as a function of cycle number, demonstrates that the trend of higher capacity with lithium excess continues upon further cycling beyond the first charge cycle.

Figure 11:
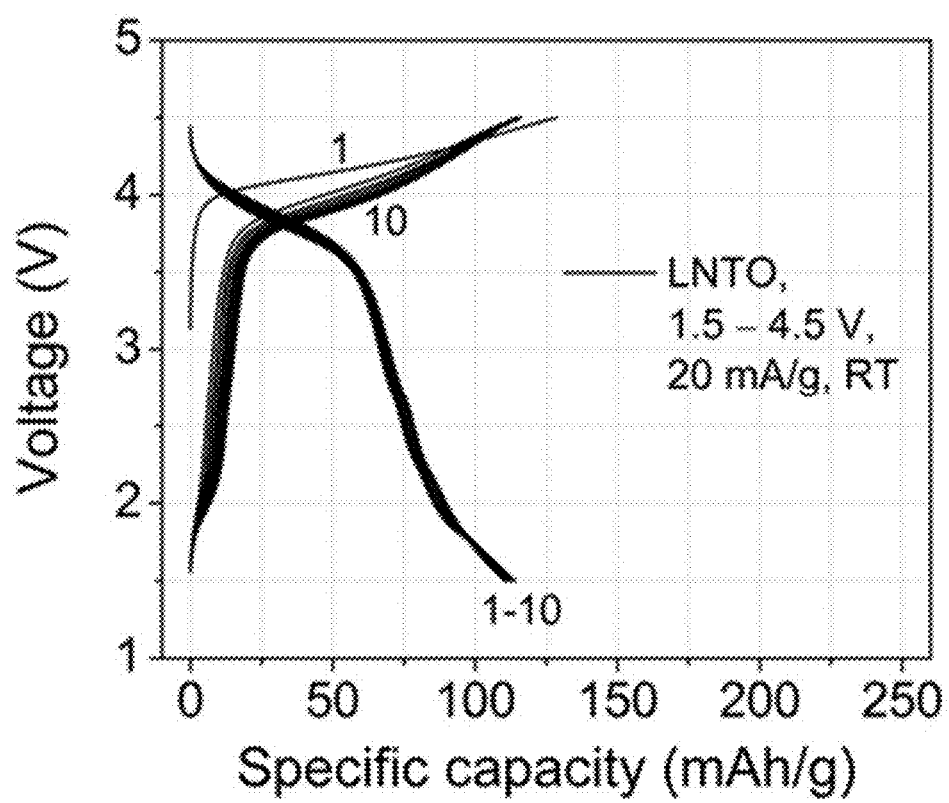
FIG. 11 is a graph of the voltage profiles of LNTO for 10 cycles.
Figure 12:
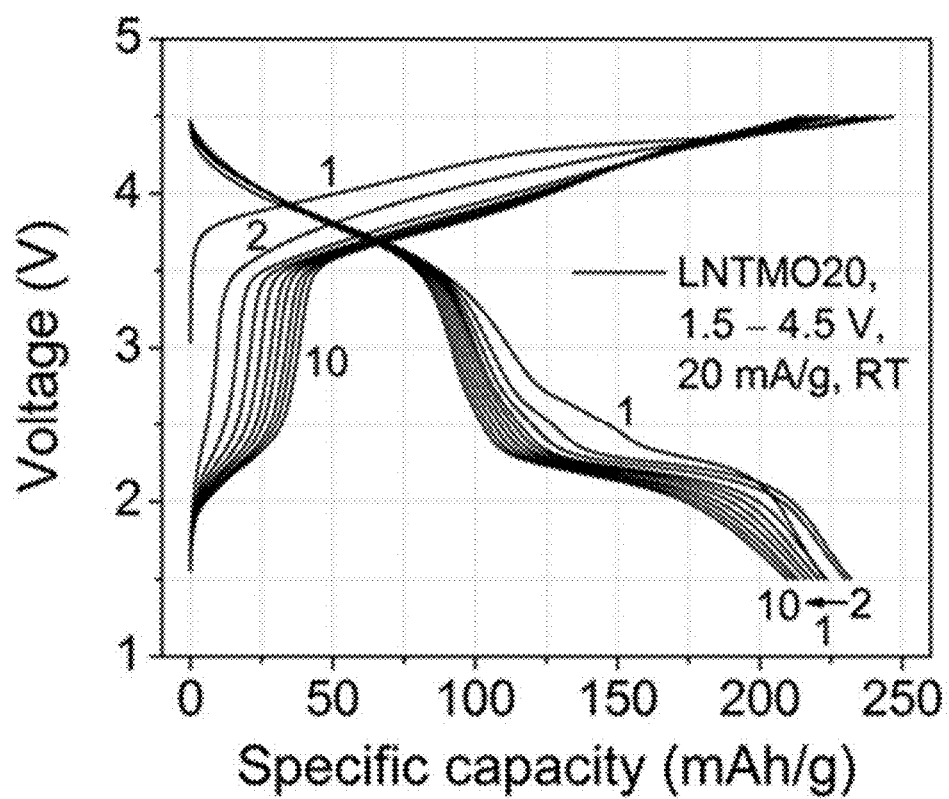
FIG. 12 is a graph of the voltage profiles of LNTMO20 for 10 cycles.

Since LNTMO20 was found to deliver the best performance among the Li—Ni—Ti—Mo oxides, it was chosen as a representative Li-excess material and its performance was further compared to that of LNTO. FIGS. 11 and 12 show the 10-cycle voltage profiles of LNTO and LNTMO20, respectively, when cycled between 1.5-4.5 V at 20 mA/g. LNTMO20 delivers much higher capacity (~230 mAh/g) and energy density (~680 Wh/kg, ~2800 Wh/l) than LNTO (~110 mAh/g, ~350 Wh/kg, ~1540 Wh/l). While the capacity above 3 V is higher for LNTMO20 compared to LNTO, most gains in the discharge capacity come at voltages lower than 3 V, particularly from the ~2.2 V plateau that becomes more obvious with cycling. This results in an average discharge voltage of ~3 V for LNTMO20. It is notable that the charge-discharge profile of LNTMO20 is asymmetric, with the end of discharge voltage being significantly lower for a large fraction of the capacity than the beginning of charge. This indicates some degree of kinetic limitation in LNTMO20, although its performance is still superior to that of LNTO.

Figure 13:
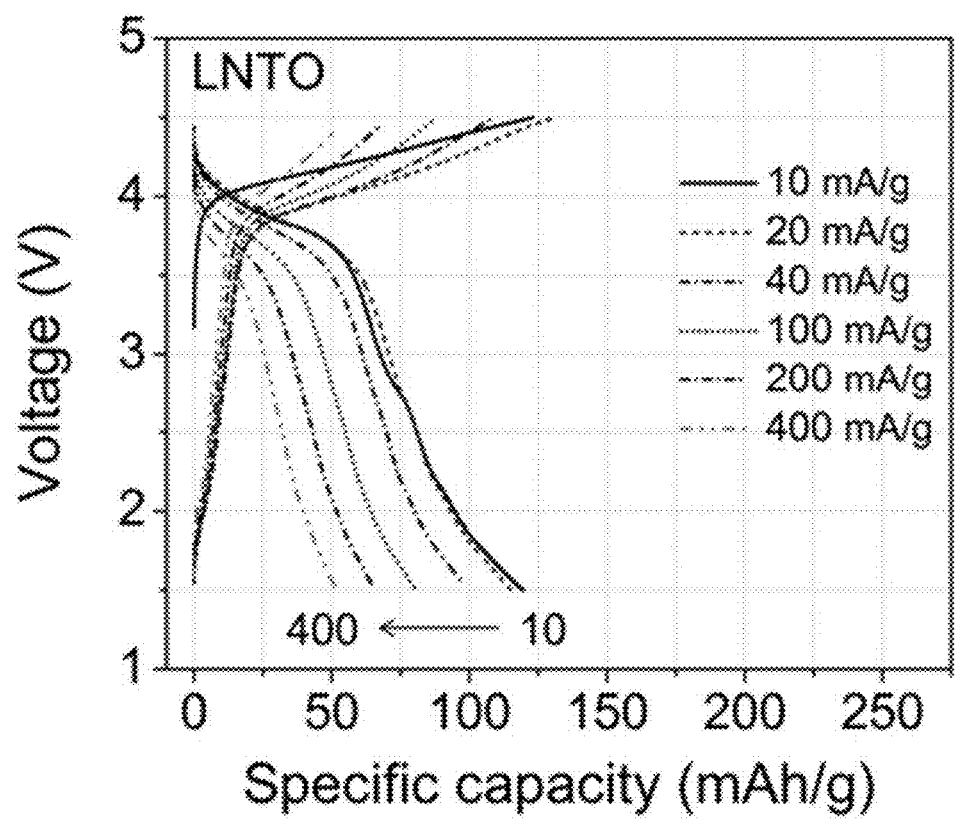
FIG. 13 is a graph of the voltage profiles of LNTO when charged and discharged at 20, 40, 100, 200, and 400 mA/g.
Figure 14:
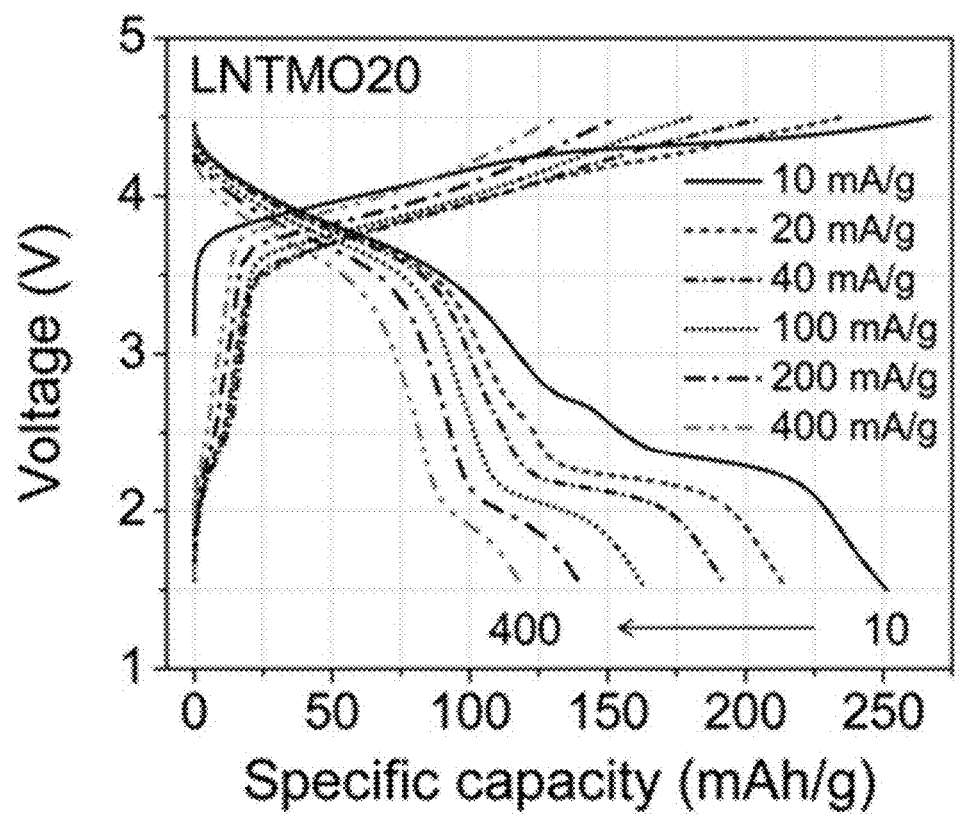
FIG. 14 is a graph of the voltage profiles of LNTMO20 when charged and discharged at 20, 40, 100, 200, and 400 mA/g.

FIGS. 13-14 depict voltage profiles at various rates for LNTO and LNTMO20, respectively. Cells made of each compound were charged and discharged once at 10 mA/g, and then at 20, 40, 100, 200, and 400 mA/g for the subsequent cycles. From the resulting voltage profiles, it is found that LNTMO20 delivers higher capacity than LNTO at all rates. As the rate increases from 10 mA/g to 400 mA/g, the discharge capacity decreases from 250 mAh/g (750 Wh/kg) to 120 mAh/g (365 Wh/kg) for LNTMO20, and from 120 mAh/g (366 Wh/kg) to 50 mAh/g (145 Wh/kg) for LNTO. Notable, the capacity of LNTMO20 at 400 mA/g is comparable to that of LNTO at 10 mA/g.

Figure 15:
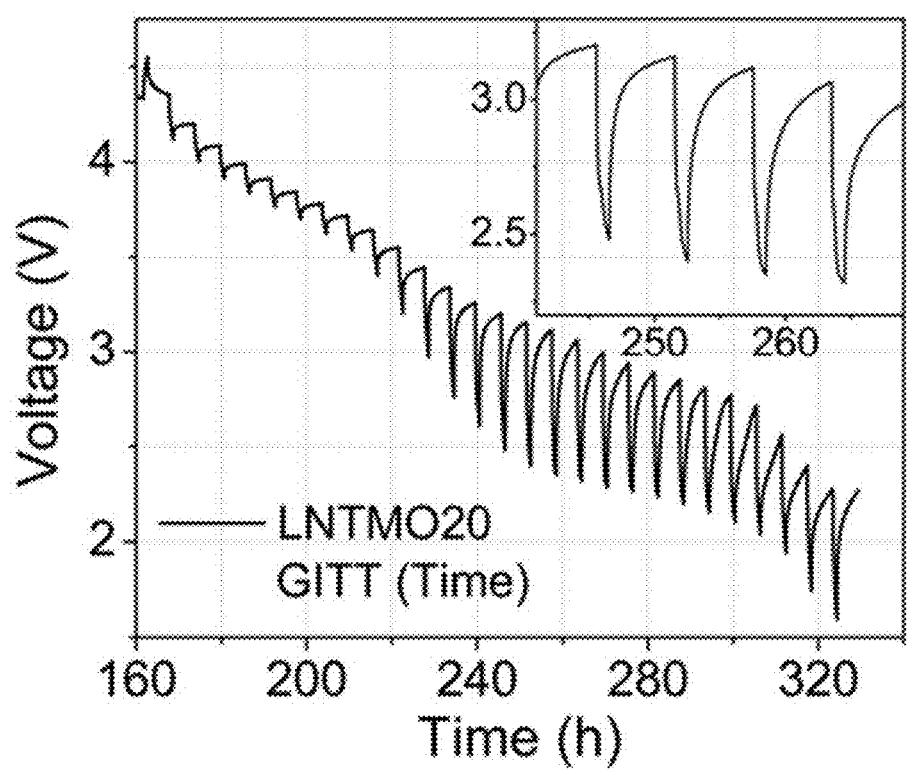
FIG. 15 is a graph of the first-discharge voltage profile of LNTMO20 from a galvanostatic intermittent titration test.
Figure 16:
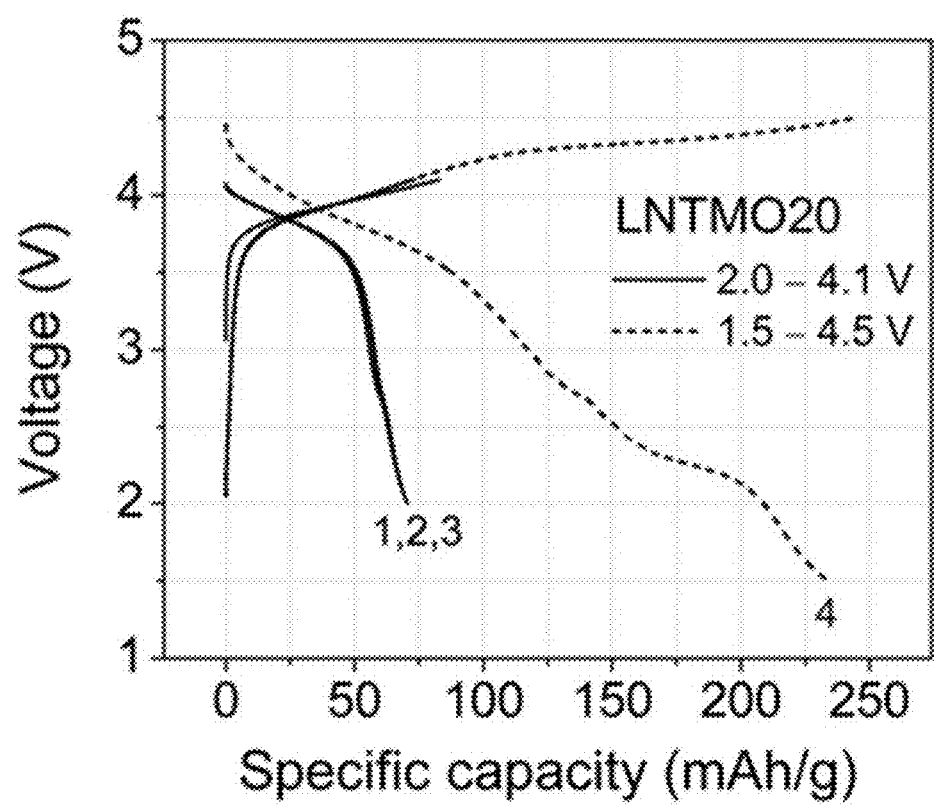
FIG. 16 is a graph of voltage profiles of LNTMO20.

The kinetics in LNTMO20 were analyzed by performing a galvanostatic intermittent titration test (GITT). FIG. 15 shows the first-discharge voltage profile of LNTMO20 from the GITT. Upon first charge to 270 mAh/g and discharge to 270 mAh/g, every step of 9 mAh/g was galvanostatically charged or discharged at 20 mA/g, and then the test cell was relaxed for five hours between each step. Polarization is most significant at the end of discharge. Voltage relaxation after each discharge step is time-dependent; without wishing to be bound by theory, this may indicate that the polarization comes mainly from the mass-transfer (Li diffusion) resistance, although other types of resistances such as by solid-electrolyte interphase (SEI) layers can further contribute to the polarization. Further, as shown in FIG. 16, the polarization may depend on the charge cutoff voltage. When the cutoff voltage is 4.1 V (solid line), the galvanostatic charge-discharge profiles are symmetric with only minor polarization. When the material is charged to 4.5 V (dashed line), discharge comes with substantial polarization, which may indicate that Li diffusion in LNTMO20 depends on structural changes that may occur at high voltage.

In situ X-ray diffraction (XRD) was performed to investigate the structural evolution of LNTMO20 upon charge and discharge. FIG. 17 shows the in situ XRD patterns of LNTMO20 upon two galvanostatic charge-discharge cycles between 1.5-4.8 V at 10 mA/g. The corresponding voltage profile and the lattice parameters from single-phase XRD refinements are shown in FIG. 18 and FIG. 19, respectively. During the first charge, the lattice parameter decreases with three distinct regimes as evidenced by the (002) peak shifting to a higher angle. For the first ~110 mAh/g of charge accompanying the sloped voltage profile, the peak continuously shifts to a higher angle. However, further peak shift is negligible up to a charge of ~215 mAh/g, along the 4.3 V plateau. After this region, the peak further shifts to a higher angle with charging. Without wishing to be bound by theory, this may indicate that the disordered lattice shrinks at the beginning and end of the first charge, but there is an interval in the middle where it does not shrink significantly. During the first discharge, the (002) peak rapidly shifts to a lower angle by discharging to ~100 mAh/g, but any further shift is small. After the first discharge, the peak is at a lower angle (~19.6 degrees) than where it was before cycling (~19.8 degrees), showing expansion of LNTMO20 after the first cycle. During the second cycle, the lattice parameter decreases upon charge and increases upon discharge until the 2.2 V plateau is reached, after which the lattice expansion is small.

Figure 20:
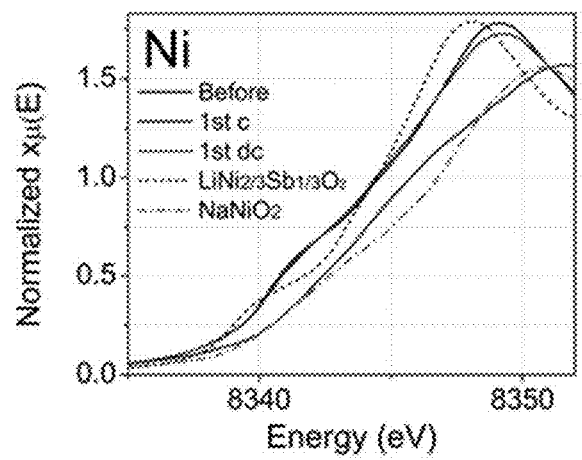
FIGS. 20-22 are graphs of the X-ray absorption near edge spectra of Ni K-edge, Ti K-edge, and Mo K-edge, respectively, in LNTMO20.
Figure 21:
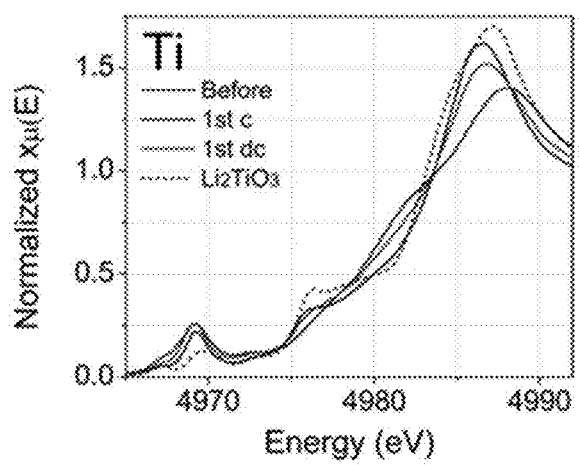
Figure 22:
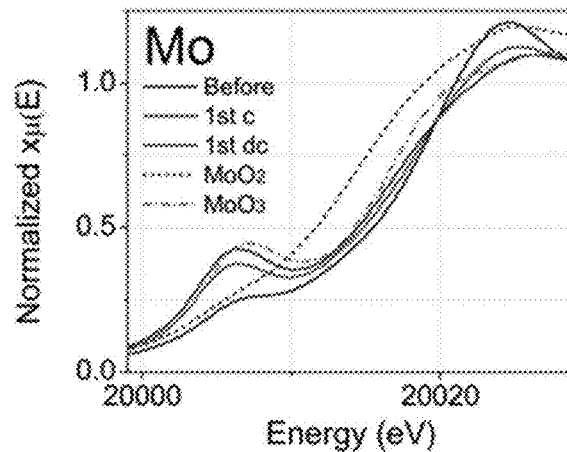

X-ray absorption near edge spectroscopy (XANES) measurements were performed to study the redox mechanisms of LNTMO20. FIGS. 20-22 show the Ni K-edge, Ti K-edge, and Mo K-edge XANES spectra of LNTMO20, respectively. Each figure shows spectra before cycling (black), after the first charge to 4.8 V (blue: ~300 mAh/g charged), and after the first discharge to 1.5 V (red: ~250 mAh/g discharged). From FIG. 20, it is seen that the Ni edge shifts from an energy close to in $LiNi_{2/3}Sb_{1/3}O_2$ used as a standard for $Ni^{2+}$ to a higher energy similar to $Ni^{3+}$ in $NaNiO_2$ upon first charge to 4.8 V. After the first discharge to 1.5 V, the Ni edge returns to its starting position. Without wishing to be bound by theory, this may indicate that $Ni^{2+}$ is oxidized up to $Ni^{\sim3+}$ upon first charge to 4.8 V, then reduces back to $Ni^{2+}$ after the first discharge. As the $Ni^{2+}/Ni^{3+}$ capacity corresponds to ~100 mAh/g, this finding may suggest that the remaining charge capacity comes from either oxygen loss and/or oxygen oxidation, both of which are known to occur in Li-excess materials.

From the absorption spectra shown in FIGS. 21-22, it is seen that the Ti and Mo edges do not shift significantly during charging and discharging. This may indicate that changes in the Mo and Ti oxidation states during the cycle, if any, are small on average. However, the pre-edge peak of Mo XANES at ~20006 eV increases in intensity after the first charge, and remains at higher intensity after the first discharge. It has been previously shown that the intensity of the pre-edge peak increases as the site symmetry of the transition metal ions decreases from a centrosymmetric to a non-centrosymmetric environment. This may be because an electric dipole-forbidden transition from the Mo is to the Mo 4d orbital (corresponding to the pre-edge peak) becomes partially allowed in a non-centrosymmetric environment which leads to stronger 4d-5p mixing. For example, the pre-edge peak observed in $MoO_3$ (dot-dashed line) originates from highly distorted Mo—O octahedra. Therefore, the intensity increase of Mo pre-edge peak of LNTMO20 shows that the Mo environment deviates from the regular octahedral coordination upon cycling, which may originate from a distortion of the Mo—O octahedra, or from some degree of $Mo^{6+}$ migration from octahedral to tetrahedral sites. Comparison with the spectra of $MoO_2$ and $MoO_3$ shows that the Mo edge position of LNTMO20 does not shift down in energy after the first discharge, which strongly suggests that the majority of the Mo ions remain 6+. Likewise, any reduction in the Ti oxidation state on discharge is small on average. However, it is noted that XANES collects information from the entire bulk particles. Therefore, changes in the oxidation states in the surface or near surface regions might not be clearly visible in the ensemble-averaged XANES spectra.

Figure 23:
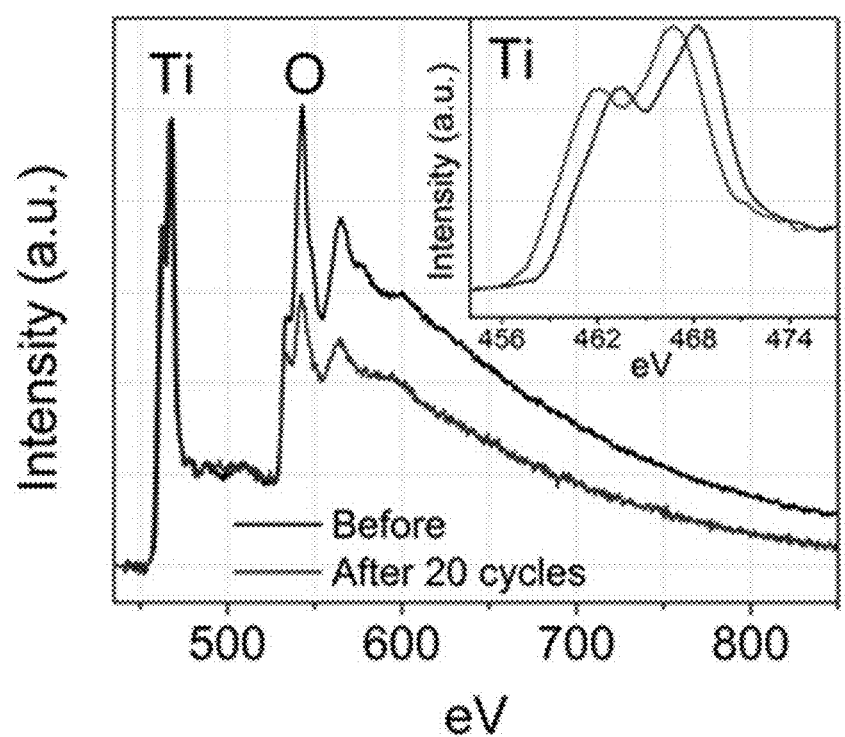
FIG. 23 is a graph of the electron energy loss spectra of Ti L-edge and O K-edge in LNTMO20.

To investigate if oxygen loss occurs from LNTMO20, electron energy loss spectroscopy (EELS) was performed on the surface of the LNTMO20 particles before and after cycling. FIG. 23 shows the Ti L-edge and O K-edge from the EELS spectra of LNTMO20 before cycling (black) and after 20 cycles (red) between 1.5-4.5 V at 20 mA/g. Comparing the EELS quantifications of the atomic ratio of O to Ti, a considerable decrease in the ratio by ~39% is found after cycling. Without wishing to be bound by theory, this may indicate that oxygen loss has occurred from the surface of LNTMO20 upon cycling, which may contribute to additional charge capacity beyond the $Ni^{2+}/Ni^{\sim3+}$ capacity. In addition, it is observed that the Ti L-edge is chemically shifted towards lower energy by ~1.5 eV relative to the O K-edge after cycling as shown in the inset in FIG. 23), which may indicate Ti reduction below 4+ at the surface region.

Figure 24:
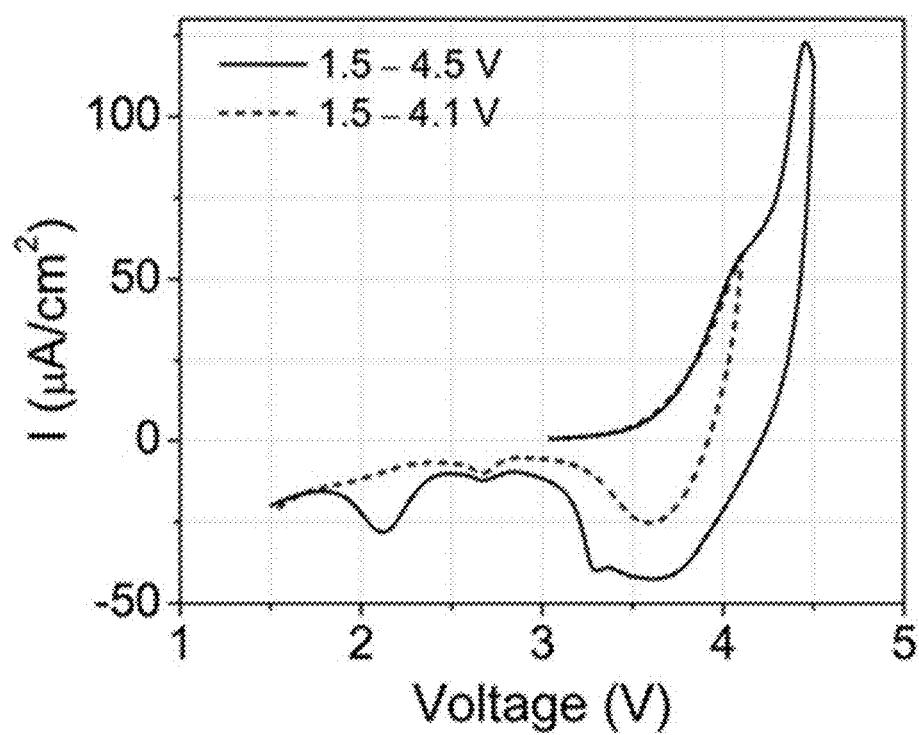
FIG. 24 is a graph of the first cycle CV profiles of LNTMO20.

Oxygen loss from LNTMO20 may also be inferred from the cyclic voltammetry (CV) tests. FIG. 24 shows the first cycle CV profiles of LNTMO20. When the oxidation cutoff voltage is 4.1 V (red), a main reduction peak is observed at ~3.7 V and a minor reduction peak is observed at ~2.7 V. However, when the cutoff is increased to 4.5 V (black), an additional reduction peak at ~2.2 V is observed in the CV profile. Without wishing to be bound by theory, this is likely associated with reduction of a second transition metal species and responsible for the discharge plateau at ~2.2 V upon galvanostatic cycling between 1.5-4.5 V (FIG. 12). This shows that charging above 4.1 V may trigger a reaction which, upon discharge, allows reduction of a species that was previously not reducible. In the case of LNTMO20, reduction of $Mo^{6+}$ or $Ti^{4+}$ upon discharge is likely triggered by oxygen loss. Although the Mo and Ti XANES do not show clear evidence of the decrease in the average Mo and Ti oxidation states after the first discharge (FIGS. 21 and 22), the apparent discrepancy between CV (or EELS) and XANES suggests that oxygen loss may be significant at the surface but not in the bulk.

Figure 25:
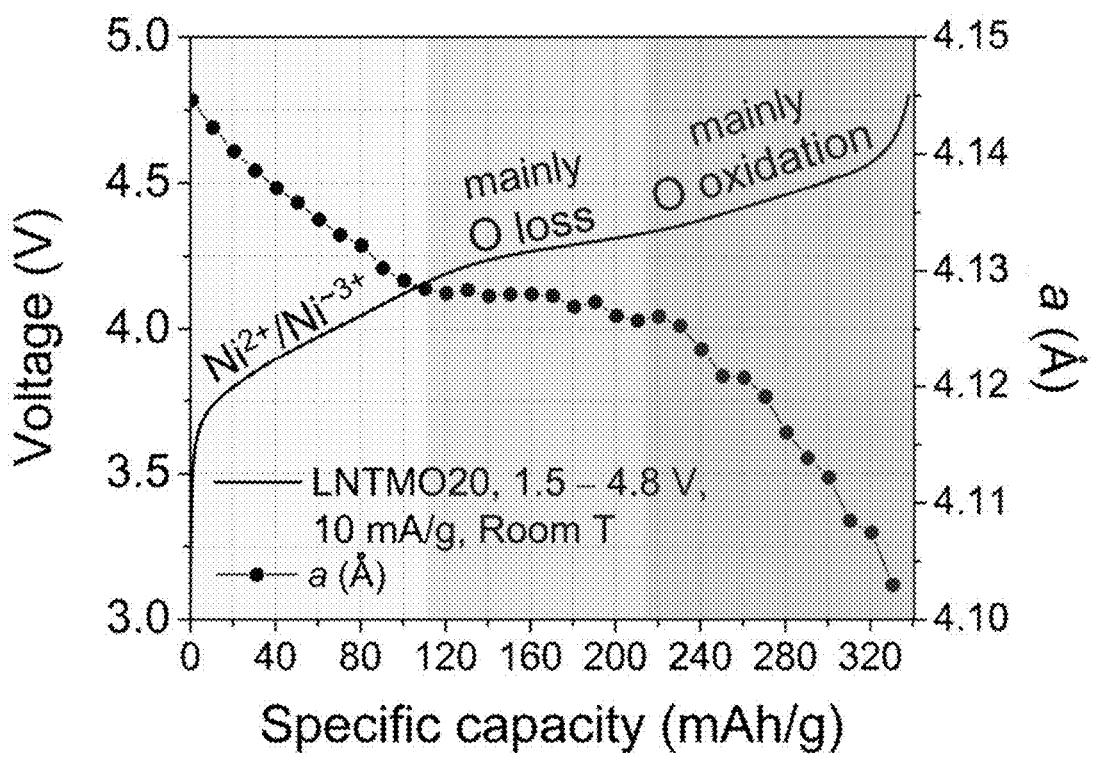
FIG. 25 is a graph of the voltage profile and lattice parameter during charge versus the capacity for LNTMO20.

Based on the above-described results from the XANES spectra, the limit for the oxygen loss capacity of LNTMO20 during the first cycle is approximated. The Ni XANES shows that $Ni^{2+}$ is oxidized to $Ni^{\sim3+}$ upon first charge to 4.8 V, which gives ~100 mAh/g in capacity (FIG. 20). As discussed above, the remaining first charge capacity (~200 mAh/g) may originate from oxygen loss and/or oxygen oxidation. Without wishing to be bound by theory, this proposed mechanism is consistent with the change in the lattice parameter of LNTMO20 during the first charge as shown in FIG. 25. Upon first charge to ~110 mAh/g, the lattice parameter decreases continuously. This may be explained with the $Ni^{2\pm}/Ni^{\sim3+}$ oxidation (~100 mAh/g) because $Ni^{3+}$(r=0.56 Å) and $Ni^{4+}$(r=0.48 Å) are smaller than $Ni^{2+}$(r=0.69 Å). Upon further charge to ~215 mAh/g, the lattice parameter barely decreases. This can be related to oxygen loss because charging with oxygen loss may slow down the increase in the oxidation states of the remaining ions in the crystal structure. It is noted that the capacity in this region is ~105 mAh/g, which roughly agrees with the maximum estimated oxygen loss capacity (~90 mAh/g) from the XANES results discussed above. Finally, charging beyond ~215 mAh/g decreases the lattice parameter. This may be explained by oxygen oxidation which shrinks the oxygen framework either by making the oxygen ions smaller in size or by introducing peroxo-like species whose oxygen-to-oxygen bond distance is shorter.

While several embodiments have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto; the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When the word "about" is used herein in reference to a number, it should be understood that still another embodiment of the invention includes that number not modified by the presence of the word "about."

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some preferred embodiments are as follows:

1. A lithium metal oxide having a general formula: $Li_aM_bM'_cO2$, said lithium metal oxide comprising $LiMO2$ and $LidM'eO2$, said lithium metal oxide having a cation-disordered rocksalt structure, wherein M comprises one or more of a metallic species chosen from a group consisting of Ti, V, Cr, Ni, Co, Fe, Mn, Zr, Sb, and Mo, M being chosen such that $LiMO2$ forms a cation-disordered rocksalt structure, and M having a first average oxidation degree n, wherein M' comprises one or more of a metallic species chosen from a group consisting of Ti, Cr, Mn, Zr, Mo, Sn, Sb, and W, and M' having a second average oxidation degree y greater than or equal to n, with $4<=y<=6$, and wherein $1<a<=1.4$, $a+b+c=2$, $d+e=2$, $d+(e \cdot y)=4$, $a+(b \cdot n)+(c \cdot y)=4$, $1.3<=d<=1.7$, and $0.2<=b<1$.

2. The lithium metal oxide of embodiment 1, wherein n is between 2.7 and 3.3.

3. The lithium metal oxide of any one of embodiments 1-2, wherein n is about 3.

4. The lithium metal oxide of any one of embodiments 1-3, wherein M' is one or more of a metallic species chosen from a group consisting of Mo and Cr, and wherein $b=(8-5a)/3$, $c=[2(a-1)]/3$, $d=1.6$, and $e=0.4$.

5. The lithium metal oxide of any one of embodiments 1-4, wherein M is an alloy of Ni and Ti in a 1:1 molar ratio.

6. The lithium metal oxide of any one of embodiments 1-5, wherein M' is Mo and y is equal to 6.

7. The lithium metal oxide of any one of embodiments 1-6, wherein XRD of the lithium metal oxide collected using Cu Kα radiation shows, in a range 5-70 degrees of 2θ(2 theta), a series of normalized intensity ratios I'z, with I'z=Iz/I(111), Iz being an first intensity of a (z) peak and I(111) being a second intensity of a (111) peak, wherein when z refers to a (111) peak, I'z=1, when z refers to a (022) peak, 2<I'z<5, and when z refers to a (002) peak, 4<I'z<10, wherein said series of normalized intensity ratios I'z corresponds to a disordered rocksalt LiMO2 structure having a Fm-3m space group.

8. The lithium metal oxide of any one of embodiments 1-7, wherein the lithium metal oxide has a lattice parameter greater than or equal to 4 Angstroms.

9. The lithium metal oxide of any one of embodiments 1-8, wherein the lattice parameter is between 4.13 Angstroms and 4.15 Angstroms.

10. The lithium metal oxide of any one of embodiments 1-9, wherein the lithium metal oxide has a first capacity greater than 109 mAh/g when charged and discharged between 1.5 and 4.5V at 20 mA/g at room temperature.

11. The lithium metal oxide of any one of embodiments 1-10, wherein the lithium metal oxide has a first capacity greater than 150 mAh/g when charged and discharged between 1.5 and 4.5V at 20 mA/g at room temperature.

12. The lithium metal oxide of any one of embodiments 1-11, wherein the lithium metal oxide presents a single phase cation-disordered rocksalt structure.

13. An electrical device, comprising an electrode comprising the lithium metal oxide of any one of embodiments 1-12.

14. A lithium metal oxide comprising:
LiaMbM'cO2 having a cation-disordered rocksalt structure, wherein M comprises at least one redox-active metallic species having a first oxidation state n and a second oxidation state n' greater than n, M' comprises at least one charge-compensating metallic species having an oxidation state y greater than or equal to n, a is greater than 1, and b and c are greater than or equal to 0, and wherein M is chosen such that a lithium-M oxide having a formula LiMO2 has a cation-disordered rocksalt structure.

15. The lithium metal oxide of embodiment 14, wherein at least some of the M is in the first oxidation state.

16. The lithium metal oxide of any one of embodiments 14-15, wherein at least some of the M is in the second oxidation state.

16. The lithium metal oxide of any one of embodiments 14-16, wherein n is at least 2.7

18. The lithium metal oxide of any one of embodiments 14-17, wherein y is at least 4.

19. The lithium metal oxide of any one of embodiments 14-18, wherein y is at least 5.

20. The lithium metal oxide of any one of embodiments 14-19, wherein y is at least 6.

21. The lithium metal oxide of any one of embodiments 14-20, wherein M includes at least one of Ti, V, Cr, Mn, Fe, Co, Ni, Zr, Sb, and Mo.

22. The lithium metal oxide of any one of embodiments 14-21, wherein M includes at least Ni and Ti.

23. The lithium metal oxide of any one of embodiments 14-22, wherein M includes equal portions of Ni and Ti.

24. The lithium metal oxide of any one of embodiments 14-23, wherein M' includes at least one of Ti, Cr, Mn, Zr Mo, Sn, Sb, and W.

25. The lithium metal oxide of any one of embodiments 14-24, wherein a is less than or equal to 1.4.

26. The lithium metal oxide of any one of embodiments 14-25, wherein the LiaMbM'cO2 has a first discharge capacity of at least 150 mAh/g when charged and discharged between 1.5 V and 4.5 V at 20 mA/g at room temperature.

27. The lithium metal oxide of embodiment 26, wherein the first discharge capacity is at least 200 mAh/g.

28. An electrical device, comprising an electrode comprising the lithium metal oxide of any one of embodiments 14-27.

29. A lithium metal oxide comprising Li1+x/100(NiTi)1/2-x/120Mox/150O2, wherein 0<x<=30.

30. The lithium metal oxide of embodiment 29, wherein x is about 20.

31. The lithium metal oxide of any one of embodiments 29-30, wherein the lithium metal oxide has a first discharge capacity of at least 150 mAh/g when charged and discharged between 1.5 V and 4.5 V at 20 mA/g at room temperature.

32. The lithium metal oxide of embodiment 31, wherein the first discharge capacity is at least 200 mAh/g.

33. An electrical device, comprising an electrode comprising the lithium metal oxide of any one of embodiments 29-32.

34. A lithium metal oxide having a general formula: LiaMbM'cO2, said lithium metal oxide comprising a disordered LiMO2 rocksalt structure enriched with LidM'eO2, said lithium metal oxide having a cation-disordered rocksalt structure, wherein M comprises one or more of a metallic species chosen from a group consisting of Ti, V, Cr, Ni, Co, Fe, Mn, Zr, Sb, and Mo, M being chosen such that LiMO2 forms a cation-disordered rocksalt structure, and M having a first average oxidation degree n, wherein M' comprises one or more of a metallic species chosen from a group consisting of Ti, Cr, Mn, Zr, Mo, Sn, Sb, and W, and M' having a second average oxidation degree y greater than or equal to n, with 4<=y<=6, and wherein 1<a<=1.4, a+b+c=2, d+e=2, d+(e·y)=4, a+(b·n)+(c·y)=4, 1.3<=d<=1.7, and 0.2<=b<1.

35. The lithium metal oxide of embodiment 34, wherein n is between 2.7 and 3.3.

36. The lithium metal oxide of any one of embodiments 34-35, wherein n is about 3.

37. The lithium metal oxide of any one of embodiments 34-36, wherein M' is one or more of a metallic species chosen from a group consisting of Mo and Cr, and wherein b=(8-5a)/3, c=[2(a-1)]/3, d=1.6, and e=0.4.

38. The lithium metal oxide of any one of embodiments 34-37, wherein M is an alloy of Ni and Ti in a 1:1 molar ratio.

39. The lithium metal oxide of any one of embodiments 34-38, wherein M' is Mo and y is equal to 6.

40. The lithium metal oxide of any one of embodiments 34-39, wherein XRD of the lithium metal oxide collected using Cu Kα radiation shows, in a range 5-70 degrees of 2θ(2 theta), a series of normalized intensity ratios I'z, with I'z=Iz/I(111), Iz being an first intensity of a (z) peak and I(111) being a second intensity of a (111) peak, wherein when z refers to a (111) peak, I'z=1, when z refers to a (022) peak, 2<I'z<5, and when z refers to a (002) peak, 4<I'z<10, wherein said series of normalized intensity ratios I'z corresponds to a disordered rocksalt LiMO2 structure having a Fm-3m space group.

41. The lithium metal oxide of any one of embodiments 34-40, wherein the lithium metal oxide has a lattice parameter greater than or equal to 4 Angstroms.

42. The lithium metal oxide of any one of embodiments 34-41, wherein the lattice parameter is between 4.13 Angstroms and 4.15 Angstroms.

43. The lithium metal oxide of any one of embodiments 34-42, wherein the lithium metal oxide has a first capacity greater than 109 mAh/g when charged and discharged between 1.5 and 4.5V at 20 mA/g at room temperature.

44. The lithium metal oxide of any one of embodiments 34-43, wherein the lithium metal oxide has a first capacity greater than 150 mAh/g when charged and discharged between 1.5 and 4.5V at 20 mA/g at room temperature.

45. The lithium metal oxide of any one of embodiments 34-44, wherein the lithium metal oxide presents a single phase cation-disordered rocksalt structure.

46. An electrical device, comprising an electrode comprising the lithium metal oxide of any one of embodiments 34-45.

The invention claimed is:

1. A lithium metal oxide having a general formula: $Li_aM_bM'_cO_2$, said lithium metal oxide comprising $LiMO_2$ and $Li_aM'_eO_2$, said lithium metal oxide having a cation-disordered rocksalt structure, wherein M comprises one or more of a metallic species chosen from a group consisting of Ti, V, Cr, Ni, Co, Fe, Mn, Zr, Sb, and Mo, M being chosen such that $LiMO_2$ forms a cation-disordered rocksalt structure, and M having a first average oxidation degree n, wherein M' comprises one or more of a metallic species chosen from a group consisting of Ti, Cr, Mn, Zr, Mo, Sn, Sb, and W, and M' having a second average oxidation degree y greater than or equal to n, with $4<=y<=6$, and wherein $1<a<=1.4$, $a+b+c=2$, $d+e=2$, $d+(e \cdot y)=4$, $a+(b \cdot n)+(c \cdot y)=4$, $1.3<=d<=1.7$, and $0.2<=b<1$.

2. The lithium metal oxide of claim 1, wherein said disordered $LiMO_2$ rocksalt structure is enriched with $Li_aM'_eO_2$.

3. The lithium metal oxide of claim 1, comprising $Li_{1+x/100}(NiTi)_{1/2-x/120}Mo_{x/150}O_2$, and wherein $0<x<=30$.

4. The lithium metal oxide of claim 3, wherein x is 20.

5. The lithium metal oxide of claim 1, wherein n is between 2.7 and 3.3.

6. The lithium metal oxide of claim 1, wherein M' is one or more of a metallic species chosen from a group consisting of Mo and Cr, and wherein $b=(8-5a)/3$, $c=[2(a-1)]/3$, $d=1.6$, and $e=0.4$.

7. The lithium metal oxide of claim 1, wherein M is an alloy of Ni and Ti in a 1:1 molar ratio and/or M' is Mo and y is equal to 6.

8. The lithium metal oxide of claim 1, wherein XRD of the lithium metal oxide collected using Cu Kα radiation shows, in a range 5-70 degrees of 2θ (2 theta), a series of normalized intensity ratios I'z, with $I'z=Iz/I(111)$, Iz being a first intensity of a (z) peak and I(111) being a second intensity of a (111) peak, wherein when z refers to a (111) peak, $I'z=1$, when z refers to a (022) peak, $2<I'z<5$, and when z refers to a (002) peak, $4<I'z<10$, wherein said series of normalized intensity ratios I'z corresponds to a disordered rocksalt $LiMO_2$ structure having a Fm-3m space group.

9. The lithium metal oxide of claim 1, wherein the lithium metal oxide has a lattice parameter greater than or equal to 4 Angstroms.

10. The lithium metal oxide of claim 1, wherein the lithium metal oxide has a first capacity greater than 109 mAh/g when charged and discharged between 1.5 and 4.5V at 20 mA/g at room temperature.

11. The lithium metal oxide of claim 1, wherein the lithium metal oxide presents a single phase cation-disordered rocksalt structure.

12. An electrical device, comprising an electrode comprising the lithium metal oxide of claim 1.

13. The lithium metal oxide of claim 1, wherein n is 3.

14. The lithium metal oxide of claim 1, wherein the lithium metal oxide has a lattice parameter between 4.13 Angstroms and 4.15 Angstroms.

15. The lithium metal oxide of claim 1, wherein the lithium metal oxide has a first capacity greater than 150 mAh/g when charged and discharged between 1.5 and 4.5V at 20 mA/g at room temperature.

16. The lithium metal oxide of claim 15, wherein the first discharge capacity is at least 200 mAh/g.

17. The lithium metal oxide of claim 1, wherein y is at least 5.

18. The lithium metal oxide of claim 1, wherein M includes at least Ni and Ti.

19. The lithium metal oxide of claim 1, wherein the lithium metal oxide has not been subjected to a charge and/or discharge cycle.

* * * * *